(12) United States Patent
Ishizuka et al.

(10) Patent No.: US 7,575,773 B2
(45) Date of Patent: Aug. 18, 2009

(54) OPTICAL COMPENSATORY SHEET PRODUCING METHOD AND APPARATUS, THERMAL TREATING METHOD AND APPARATUS, AND DUST REMOVING METHOD AND APPARATUS

(75) Inventors: Seiji Ishizuka, Kanagawa (JP); Munehiro Ura, Kanagawa (JP); Tadashi Sugiyama, Kanagawa (JP); Kenji Nakajima, Kanagawa (JP); Kazuhiko Fujiwara, Kanagawa (JP); Naoyuki Kawanishi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 355 days.

(21) Appl. No.: 11/377,672

(22) Filed: Mar. 17, 2006

(65) Prior Publication Data

US 2006/0177587 A1 Aug. 10, 2006

Related U.S. Application Data

(60) Continuation of application No. 10/919,377, filed on Aug. 17, 2004, now abandoned, which is a division of application No. 09/851,416, filed on May 9, 2001, now Pat. No. 6,812,982.

(30) Foreign Application Priority Data

| May 12, 2000 | (JP) | ............................. 2000-140023 |
| Jul. 6, 2000 | (JP) | ............................. 2000-204557 |
| Jul. 21, 2000 | (JP) | ............................. 2000-220330 |

(51) Int. Cl.
*B05D 5/06* (2006.01)
*B05D 3/04* (2006.01)

(52) U.S. Cl. ............................. 427/58; 118/68; 349/76; 427/377; 427/378; 454/252

(58) Field of Classification Search ................. 427/177, 427/378, 58, 377; 454/252; 118/68; 349/76
See application file for complete search history.

(56) References Cited

U.S. PATENT DOCUMENTS

| 3,914,477 | A | 10/1975 | Belue et al. |
| 3,956,790 | A | 5/1976 | Ishiwata et al. |
| 4,365,423 | A | 12/1982 | Arter et al. |
| 4,569,695 | A | 2/1986 | Yamashita et al. |
| 4,577,362 | A | 3/1986 | Tanaka et al. |
| 5,064,697 | A | 11/1991 | Takiguchi et al. |
| 5,299,362 | A | 4/1994 | Baldinger |

(Continued)

FOREIGN PATENT DOCUMENTS

EP 0 911 656 4/1999

(Continued)

*Primary Examiner*—Fred J. Parker
*Assistant Examiner*—Jimmy Lin
(74) *Attorney, Agent, or Firm*—Sughrue Mion, PLLC

(57) ABSTRACT

An optical compensatory sheet producing apparatus produces an optical compensatory sheet having a liquid crystal layer. In the apparatus, a rubbing unit is supplied with resin film having a first layer including resin, and subjects the first layer to a rubbing process, so as to form an orientation layer. A dust remover removes dust from the orientation layer by use of liquid such as perfluorocarbon, to which the orientation layer is insoluble. A liquid crystal layer coater is disposed downstream from the dust remover, for coating the orientation layer with coating liquid including liquid crystalline compound, so that the liquid crystal layer is formed.

3 Claims, 18 Drawing Sheets

U.S. PATENT DOCUMENTS

| | | | |
|---|---|---|---|
| 5,506,706 A | 4/1996 | Yamahara et al. | |
| 5,583,679 A | 12/1996 | Ito et al. | |
| 5,631,051 A | 5/1997 | Ito | |
| 5,646,703 A | 7/1997 | Kamada et al. | |
| 5,853,801 A | 12/1998 | Suga et al. | |
| 6,008,873 A * | 12/1999 | Swirbel et al. | 349/123 |
| 6,390,618 B1 * | 5/2002 | Wotton et al. | 347/102 |
| 6,582,775 B1 | 6/2003 | Payne et al. | |
| 6,637,127 B2 | 10/2003 | Reede et al. | |

FOREIGN PATENT DOCUMENTS

| | | |
|---|---|---|
| JP | 62-65872 | 3/1987 |
| JP | 3-291601 | 12/1991 |
| JP | 5-50419 | 7/1993 |
| JP | 5-215921 | 8/1993 |
| JP | 6-75115 | 3/1994 |
| JP | 8-1122 | 1/1996 |
| JP | 9-73081 | 3/1997 |
| JP | 9-152509 | 6/1997 |
| JP | 9-292617 | 11/1997 |
| JP | 10-290964 | 11/1998 |
| JP | 10-309553 | 11/1998 |

* cited by examiner

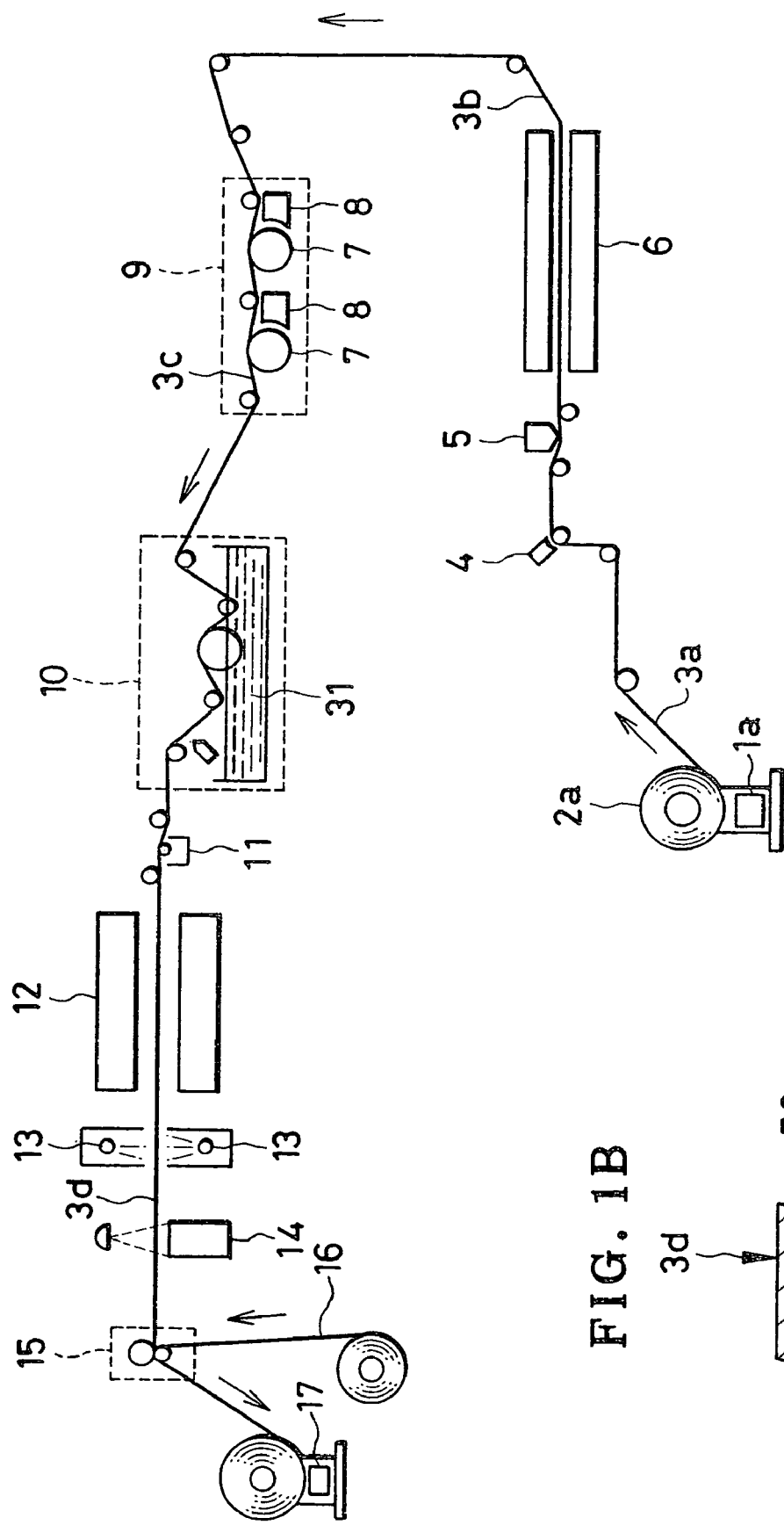
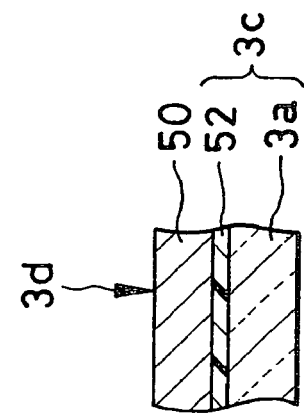

ANIONIC POLYMER

ALKYL MODIFIED PVA

DISCOTIC LIQUID CRYSTAL COMPOUND $R = -O-CO-\phantom{}-O-(CH_2)_6-O-CO-CH=CH_2$

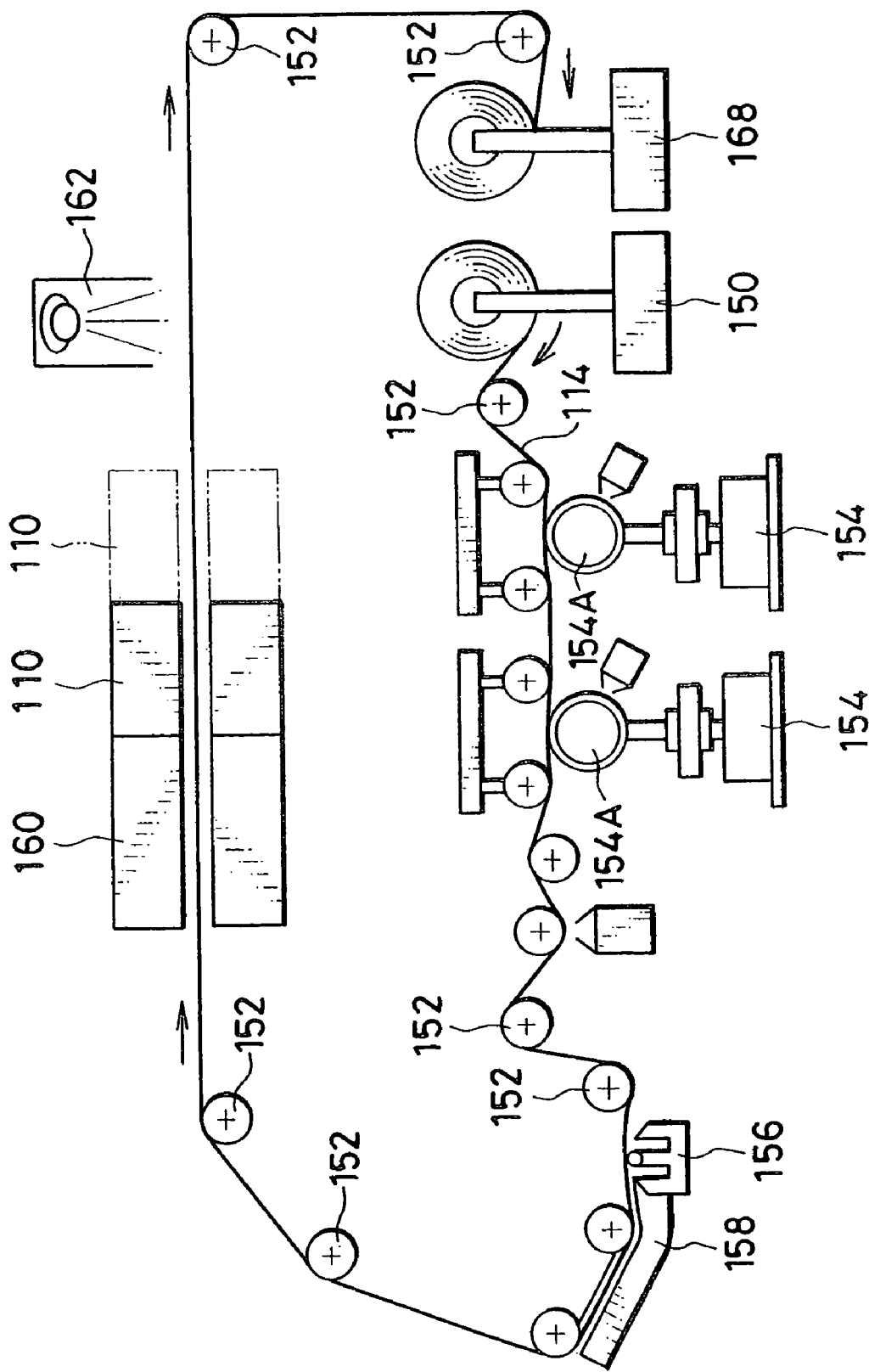

FIG. 17A

|  |  | Comp. Ex. 6 | Comp. Ex. 7 |
|---|---|---|---|
| Dry Removal of Dust |  | None | None |
| Wet Removal of Dust | Polishing | Wire Bar | Rubber Roll |
|  | Circulating Flow (liter/min) | None | 30 |
|  | Ultrasonic Waves | None | On |
|  | Pressure (N/m) | None | None |
| Drying With Blow |  | None | None |
| Non-contact Feeding |  | None | None |
| 3μm Particles (Per m) | 50 m | 203 | 42 |
|  | 3,000 m | 259 | 56 |
| 10μm Particles (Per m) | 50 m | 69 | 16 |
|  | 3,000 m | 81 | 20 |
| Scratches |  | Numerous | Locally Existed |

FIG. 17B

|  |  | Comp. Ex. 8a | Comp. Ex. 8b | Sample 5a | Sample 5b |
|---|---|---|---|---|---|
| Dry Removal of Dust |  | Existed | Existed | Existed | Existed |
| Wet Removal of Dust | Polishing | Rubber Roll | Rubber Roll | Rubber Roll | Rubber Roll |
|  | Circulating Flow (liter/min) | 30 | 30 | 30 | 30 |
|  | Ultrasonic Waves | On | On | On | On |
|  | Pressure (N/m) | None | None | 9.8 | 19.6 |
| Drying With Blow |  | None | Existed | Existed | Existed |
| Non-contact Feeding |  | None | Existed | Existed | Existed |
| 3μm Particles (Per m) | 50 m | 25 | 22 | 5 | 1 |
|  | 3,000 m | 29 | 26 | 7 | 1 |
| 10μm Particles (Per m) | 50 m | 6 | 2 | 1 | 1 |
|  | 3,000 m | 7 | 1 | 1 | 0 |
| Scratches |  | Locally Existed | None | None | None |

OPTICAL COMPENSATORY SHEET PRODUCING METHOD AND APPARATUS, THERMAL TREATING METHOD AND APPARATUS, AND DUST REMOVING METHOD AND APPARATUS

This is a continuation of application Ser. No. 10/919,377 filed Aug. 17, 2004, now abandoned which is a divisional of application Ser. No. 09/851,416 filed May 9, 2001, now U.S. Pat. No. 6,812,982. The entire disclosures of the prior applications, application Ser. Nos. 09/851,416 and 09/851,416 are considered part of the disclosure of the accompanying application and are hereby incorporated by reference.

BACKGROUND OF THE INVENTION

1. Field of the Invention

The present invention relates to an optical compensatory sheet producing method and apparatus, thermal treating method and apparatus, and dust removing method and apparatus. More particularly, the present invention relates to an optical compensatory sheet producing method and apparatus in which an optical compensatory sheet can be obtained with high quality for good contrast and color in a liquid crystal display unit, and thermal treating method and apparatus, and dust removing method and apparatus for the optical compensatory sheet.

2. Description Related to the Prior Art

A liquid crystal display unit (LCD) is characterized in having a shape with a small thickness, being lightweight and using low electric power in comparison with a cathode ray tube (CRT) to display an image. LCD is used widely as a component incorporated in a portable type of word processor and a desk-top type of personal computer. In LCD, twisted nematic liquid crystal is used. In general, LCD include a liquid crystal cell and a pair of polarizing plates between which the liquid crystal cell is disposed. The liquid crystal cell is constituted by a liquid crystal panel and an electrode for applying voltage to the between the orientation layers. To display an image in LCD, there are two modes include a birefringence mode and an optically rotary mode.

A super twisted nematic LCD (hereinafter referred to as STN-LCD) utilizing the birefringence mode uses a super twisted nematic liquid crystal showing a twisted angle more than 90 degrees and having steep electro-optical characteristics. Such STN-LCD, therefore, has an advantage of giving display data of a large size by driving in time-sharing mode. However, the STN-LCD has disadvantages in providing good contrast only when set in the yellow mode (yellowish green/deep blue) or blue mode (blue/pale yellow). A phase difference plate (uniaxial stretched polymer film or compensatory liquid crystal cell) is required to give black-and-white display.

TN-LCD, when set in an optically rotary mode, shows quick response (as quick as several tens of milliseconds) and high display contrast. Hence, the optical rotary mode has a number of advantages compared with the birefringence mode or other modes. However, TN-LCD has disadvantages that color or contrast on display varies with changes in viewing angle to LCD, and its display characteristics are not comparable to display characteristics of CRT.

In order to improve the viewing angle characteristics (i.e., to enlarge the viewable angle), arrangement of a phase difference film (optical compensatory sheet) between a pair of polarizing plates and the liquid crystal cell has been known. The optical compensatory sheets show no optical effect when an LCD is seen in the direction vertical to the screen of the display because phase difference in the direction perpendicular to the surface of LCD is almost zero. However, the optical compensatory sheet serves to compensate for phase difference (depending upon wavelengths of light) that occurs when LCD is viewed in an oblique direction.

JP-A 6-075115, U.S. Pat. No. 5,506,706 (corresponding to JP-A 6-075116), and JP-A 4-276076 disclose an optical compensatory sheet having the negative birefringence and inclined optical axis. In more detail, the disclosed sheet is produced by stretching polymer such as polycarbonate or polyester, and has the directions of the main refractive indices which are inclined from the normal of the sheet. To prepare the above sheet by the stretching treatment, extremely complicated treatments are required. Therefore, an optical compensatory sheet of a large surface are cannot be easily produced according to the disclosed process.

Also, an optical compensatory sheet comprising liquid crystalline polymer is known. For instance, U.S. Pat. No. 5,064,697 (corresponding to JP-A 3-009326) and JP-A 3-291601 disclose an optical compensatory sheet for LCD which is prepared by applying a coating of polymer showing liquid crystal property on an orientation layer provided on a support film. However, polymers having a liquid crystalline property have a shortcoming in low productivity and are unsuitable for mass production, because it needs orientation by ripening for a long time at high temperature. JP-A 5-215921 discloses the use of a birefringence plate (optical compensatory sheet) comprising a support and a polymerizable rod-like compound showing liquid crystal property and positive birefringence. The birefringence plate is prepared by applying a coating of solution of the rod-like compound to the support and curing the compound with heat. The cured layer of the prior document, however, does not show negative birefringence. Hence, the resulting compensatory sheet cannot enlarge satisfactorily the viewing angle in all directions.

U.S. Pat. No. 5,646,703 (corresponding to EP-A 0 646 829) discloses an optical compensatory sheet greatly enlarging the viewing angle in all directions. The optical compensatory sheet has a representative structure comprising a transparent support, an orientation layer thereon, and a layer of discotic liquid crystalline compound provided on the orientation layer.

To produce an optical compensatory sheet with a large area, a transparent resin film with a large area must be coated with a discotic liquid crystal compound in a state substantially free from defects. So it has been conceived to reduce the number of the defects in consideration of enlarging LCD.

To produce the optical compensatory sheet, a rubbing process rubs a surface of a resin layer overlaid on the resin film for forming an orientation layer by use of a rubbing sheet (of fabric). This creates dust such as minute particles of resin. The dust becomes collectively stuck on a surface of the orientation layer, to create the defects (uneven orientation or local failure in orientation) in an oriented state of a liquid crystal layer of the optical compensatory sheet. When LCD is provided with the optical compensatory sheet, the defects occur in a display state. To avoid failure in removal of dust, the rubbing sheet about a rubbing roller should be exchanged and renewed frequently. However, there is a problem in that occurrence of the defects gradually becomes frequent according to dust. Furthermore, renewal of the rubbing sheet must be periodical, and inconsistent to continuous operation of the manufacture.

JP-A 9-073081 discloses a producing method of an optical compensatory sheet. Transparent resin film in a continuous shape is coated with solution including resin for forming an orientation layer, then is subjected to a rubbing process. So the orientation layer is formed, then is coated with solution including discotic liquid crystalline compound. Then the coating is dried. The resin film is thermally treated next. The resin film is heated to discotic nematic forming temperature, to form a liquid crystal layer oriented at a predetermined angle of an orientation axis.

In FIG. 18, an example of thermal treating apparatus is depicted. There are plural air blow openings 102 disposed above and below resin film 101 as web, and arranged in an alternate manner with one another. The air blow openings 102 supply hot air, blow both surface of the resin film 101, and apply heat thereto. Exhaust openings 103 are opposed to respectively the air blow openings 102, and ejects the hot air from the resin film 101.

In the optical compensatory sheet, the liquid crystal layer must be oriented according to an orientation axis previously intended.

In the thermal treating apparatus according to the prior art, it is likely that offsetting of an orientation axis occurs in a width direction of the discotic liquid crystal layer. If the offsetting of the orientation axis is over a tolerable range, portions of the resin film must be discarded. There are problems in that yield of products of the optical compensatory sheet decreases to increase the manufacturing cost, and that efficiency in manufacturing operation becomes lower according to inspection of the offsetting of the orientation axis and the discarding operation.

In manufacturing the optical compensatory sheet, dust must be removed from the resin film by a dust removing apparatus. U.S. Pat. No. 4,577,362 (corresponding to JP-A 59-150571) discloses an example of dust removal in a dry type. A non-woven fabric or blade is pressed against a surface of the resin film. Also, JP-A 10-309553 discloses dust removal in which compressed air with high cleanness is supplied to blow the resin film and separate dust from the same. An exhaust opening sucks the dust by ejecting the air. Also, there is an apparatus characterized in that an ultrasonic vibrator is used to vibrate an air flow, which separates dust with higher shearing force for the purpose of efficient cleaning.

Also, JP-A 10-290964 discloses a dry type of dust removal in which electrostatic charge is used. Positive and negative ions of air are injected to neutralize the charge. Dust is separated and then eliminated by use of another flow or air.

Also, a wet type of dust removal is also known. There is a method in which the resin film is traveled through a cleaning liquid in a cleaning liquid bath, and an ultrasonic vibrator is driven to separate dust from the resin film in the cleaning liquid bath. Furthermore, U.S. Pat. No. 3,956,790 (corresponding to JP-B 49-013020) discloses a method in which the resin film is supplied with cleaning liquid, and then compressed air blows the resin film to such the dust.

Those cleaning methods are effective to dust of particles of at least 10 μm or tens of μm, or dust stuck weakly. However, it is experimentally found that the known cleaning methods are nearly ineffective to dust of particles of 10 μm or less, or dust stuck with strong adhesion.

To solve such problems. JP-B 5-050419 (corresponding to JP-A 62-060749) proposes a method in which a cleaning rod is pressed against the resin film to remove dust. For the cleaning rod, the resin film immediately after being coated with solvent is supplied. The cleaning rod is caused to rotate in reverse to the traveling to clear the dust while the solvent remains. According to the document, a space is formed between the resin film and the cleaning rod with a small thickness. Dust having a size over the space is stopped from passing the rod. Also, more minute dust is separated by transmission of shearing force in the solvent liquid, so that dust of a small size or strongly stuck dust can be removed effectively.

Also, JP-A 62-065872 discloses a dust removing method in which a blade with a sharp edge is used to contact the resin film.

However, problems arise in the method of JP-B 5-050419 (corresponding to JP-A 62-060749) and JP-A 62-065872. The cleaning rod or the like directly contact the surface of the resin film. The cleaning rod or the like is formed from super hard alloy resistant to abrasion, and has a very smooth surface. Damages or scratches may occur in the resin film if hard foreign matter or dust becomes squeezed between the cleaning rod and the resin film.

SUMMARY OF THE INVENTION

In view of the foregoing problems, an object of the present invention is to provide an optical compensatory sheet producing method and apparatus in which an optical compensatory sheet can be easily and efficiently obtained with high quality for good contrast and color in a liquid crystal display unit.

Another object of the present invention is to provide a thermal treating method and apparatus in which sheet material can be heated without irregularity.

Still another object of the present invention is to provide a dust removing method and apparatus capable of removing dust from sheet material without scratching or damaging its surface.

In order to achieve the above and other objects and advantages of this invention, an optical compensatory sheet producing method for producing an optical compensatory sheet having a liquid crystal layer is provided. A first layer of support material is subjected to a rubbing process, so as to form an orientation layer, the first layer including resin. Dust is removed from the orientation layer by use of liquid to which the orientation layer is insoluble. After the removing step, the orientation layer is coated with coating liquid including liquid crystalline compound, thereby the liquid crystal layer being formed.

In a preferred embodiment, the removing step includes polishing the orientation layer with the liquid in a direction equal to a direction of the rubbing process.

An optical compensatory sheet producing apparatus produces an optical compensatory sheet having a liquid crystal layer. In the apparatus, a rubbing unit is supplied with support material having a first layer including resin, for subjecting the first layer to a rubbing process, so as to form an orientation layer. A dust remover removes dust from the orientation layer by use of liquid to which the orientation layer is insoluble. A liquid crystal layer coater is disposed downstream from the dust remover, for coating the orientation layer with coating liquid including liquid crystalline compound, thereby the liquid crystal layer being formed.

Furthermore, a liquid bath contains the liquid. The dust remover includes a cleaning roller, dipped in the liquid at least partially, for contacting the orientation layer, to polish the orientation layer with the liquid in the direction of the rubbing process.

Furthermore, a resin layer coater is disposed upstream from the rubbing unit, for coating the support material with first coating liquid including the resin, to obtain the first layer. A thermal treating unit is disposed downstream from the liquid crystal layer coater, for heating the liquid crystalline compound at phase forming temperature, to form the liquid crystal layer. A curing unit cures the liquid crystal layer to obtain the optical compensatory sheet.

The liquid is perfluorocarbon having 6-12 carbon atoms.

In another preferred embodiment, the liquid is straight chain siloxane having 2-4 silicon atoms.

Furthermore, a dry-type dust remover is disposed upstream from the dust remover, for removing dust from the orientation layer by blow of compressed air.

Consequently, an optical compensatory sheet can be easily and efficiently obtained with high quality for good contrast and color in a liquid crystal display unit, because the dust remover removes dust from the orientation layer by use of liquid to which the orientation layer is insoluble, and because the orientation layer is polished with the liquid in a direction equal to a direction of the rubbing process.

According to one aspect of the invention, a thermal treating apparatus for a coating layer formed by coating traveling web with coating liquid is provided. At least one hot air supply unit blows the coating layer with hot air. At least one exhaust unit is disposed upstream or downstream from the hot air supply unit in a traveling direction of the web, for sucking the hot air from the coating layer.

Furthermore, a controller adjusts a first flow speed at which the hot air is supplied by the hot air supply unit, and a second flow speed at which the hot air is sucked by the exhaust unit.

The hot air supply unit includes a hot air generator for generating the hot air. An air blow opening is disposed to face the coating layer. A supply fan or blower is controlled by the controller, for sending the hot air from the hot air generator through the air blow opening. The exhaust unit includes an exhaust opening disposed to face the coating layer. An exhaust fan or blower is controlled by the controller, for sending the hot air from the exhaust opening.

The controller controls the supply fan or blower and the exhaust fan or blower, to keep a flow speed of the hot air equal to or lower than 1 m/sec with reference to a web width direction crosswise to the traveling direction.

As viewed in the web width direction, the air blow opening has 1.05-2 times as great a size as a width of the web.

Furthermore, a flow speed sensor detects the flow speed of the hot air on the coating layer. The controller controls the supply fan or blower and the exhaust fan or blower according to the flow speed.

The air blow opening includes plural air blow nozzles arranged in the traveling direction.

In another preferred embodiment, the air blow nozzles are arranged in a matrix manner.

In still another preferred embodiment, the air blow nozzles are slit-shaped and extend crosswise to the traveling direction.

In an additional preferred embodiment, the air blow nozzles are disposed in a zigzag manner.

The hot air supply unit is disposed 3-300 mm distant from the coating layer.

The at least one hot air supply unit comprises plural hot air supply units. The at least one exhaust unit comprises plural exhaust units disposed alternately with the plural hot air supply units in the traveling direction.

Furthermore, a far infrared heater applies heat energy to the coating layer in addition to the hot air from the hot air supply unit.

The coating liquid includes liquid crystalline compound, and the coating layer is a liquid crystal layer of an optical compensatory sheet.

Consequently, web can be heated without irregularity, because the exhaust unit is disposed upstream or downstream from the hot air supply unit in a traveling direction of the web.

According to another aspect of the invention, a dust removing apparatus for web is provided. A first dust remover removes dust from the web by blowing a first surface of the web with compressed air. A rinsing unit is disposed downstream from the first dust remover with reference to the web being traveled, for removing dust from the web by rinsing the first surface with liquid. A second dust remover is disposed between the first dust remover and the rinsing unit, including a cleaning member and a pinch member for contacting respectively the first surface and a second surface of the web, to nip the web, wherein the cleaning member polishes the first surface with liquid, to remove dust from the web.

The cleaning member and the pinch member are a cleaning roller and a rotatable pinch roller. Furthermore, a liquid bath contains the liquid in which the cleaning roller is dipped at least partially.

Each of the cleaning roller and the pinch roller includes a roller body, and a resilient roll fitted about the roller body.

Furthermore, a feeder travels the web at one traveling speed. A motor rotates the cleaning roller at one peripheral speed different from the traveling speed.

The first dust remover includes at least one air blow opening for blowing the first surface with the compressed air to separate the dust from the web. At least one exhaust opening for sucking the compressed air to eject the dust.

The at least one air blow opening and the at least one exhaust opening are slit-shaped and extend in a web width direction crosswise to a traveling direction of the web.

The first dust remover includes an ultrasonic vibrator for ultrasonically vibrating the compressed air to be supplied from the air blow opening.

The second dust remover further includes an ultrasonic vibrator, disposed in the liquid bath, for applying ultrasonic waves to the cleaning roller dipped in the liquid, to remove dust from the cleaning roller.

Furthermore, a drier is disposed downstream from the rinsing unit, for blowing the web with air to dry the liquid.

The drier includes at least one air blow opening for blowing the first surface with the air to separate the liquid from the web. At least one exhaust opening for sucking the air to eject the liquid.

The at least one air blow opening and the at least one exhaust opening are slit-shaped and extend in a web width direction crosswise to a traveling direction of the web.

The drier includes an ultrasonic oscillator for ultrasonically vibrating the air to be supplied from the air blow opening.

Furthermore, at least one pair of rotatable edge rollers support first and second edges of the first or second surface, to guide the web in a non-contact state from a central portion of the web.

In another preferred embodiment, furthermore, a hovering roller is opposed to the first or second surface, for guiding the web. Plural holes or slits are formed in a peripheral wall of the hovering roll. A fan or blower blows the web through the plural holes or slits with compressed air, to keep the web in a non-contact state from the web.

Consequently, it is possible to remove dust from sheet material without scratching or damaging its surface, because the cleaning member and pinch member nip the web, and the cleaning member polishes the first surface with liquid.

BRIEF DESCRIPTION OF THE DRAWINGS

The above objects and advantages of the present invention will become more apparent from the following detailed description when read in connection with the accompanying drawings, in which:

FIG. 1A is an explanatory view in elevation, illustrating an optical compensatory sheet producing apparatus of the invention;

FIG. 1B is an explanatory view in section, illustrating an optical compensatory sheet;

FIG. 14 is an explanatory view in elevation, illustrating an overall arrangement of a sheet producing system having the thermal treating apparatus;

FIG. 17A is a table illustrating results of experiments according to comparative examples;

FIG. 17B is a table illustrating results of experiments according to samples of the invention.

DETAILED DESCRIPTION OF THE PREFERRED EMBODIMENT(S) OF THE PRESENT INVENTION

Figure 2:
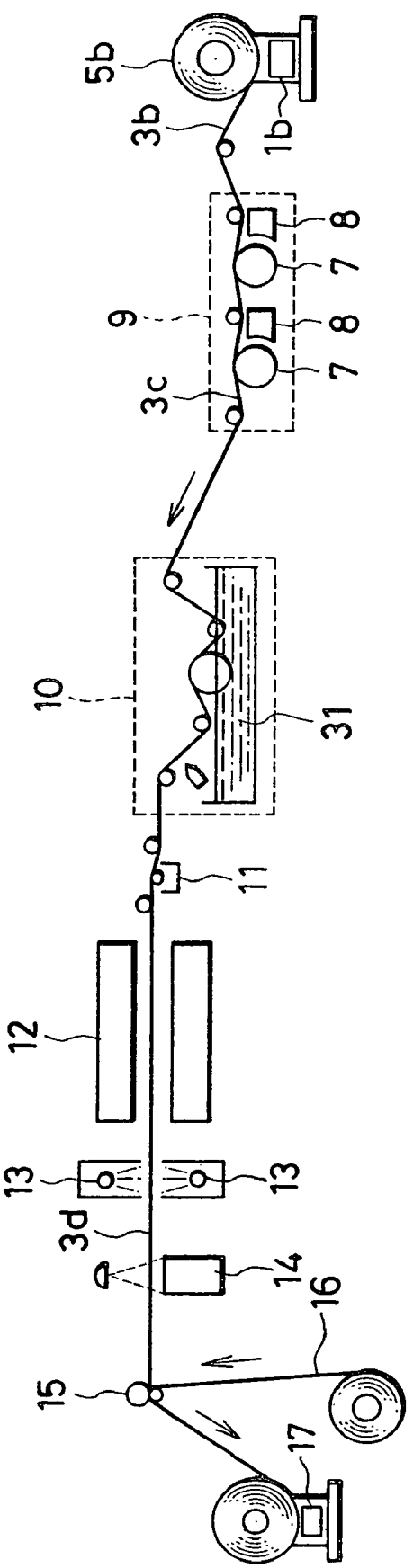
FIG. 2 is an explanatory view in elevation, illustrating another optical compensatory sheet producing apparatus supplied with a roll of support material web with a resin layer.

A method of manufacturing an optical compensatory sheet of the invention is characterized in dust removal in a wet type after a rubbing process of an orientation layer laminated on a transparent resin film.

The manufacturing method includes plural steps as follows:

1. Step of supplying transparent resin film;
2. Step of forming a preliminary resin layer by coating a surface of the resin film with solution having resin to form an orientation layer, and by drying;
3. Step of rubbing for forming the orientation layer on the resin film according to a rubbing treatment of the surface of the preliminary resin layer on the resin film;
4. Step of dust removal, either by eliminating dust from the surface of the orientation layer according to a wet type, or by eliminating dust from the surface of the orientation layer according to a dry type and then a wet type;
5. Step of coating the orientation layer with a coating layer including a liquid crystalline compound;
6. Step of drying the coating layer to evaporate solvent in the coating layer;
7. Step of forming a liquid crystal layer by heating the coating layer to a phase forming temperature;
8. Step of hardening the liquid crystal layer, either by forcibly cooling the liquid crystal layer, or by cross linking of the liquid crystal layer photochemically or with heat typically if the liquid crystalline compound has a cross linking functional group;
9. Step of winding the resin film with the orientation layer and the liquid crystal layer.

In FIGS. 1A and 1B, a web supply device 1a is loaded with a film roll 2a, from which the web supply device 1a supplies transparent resin film 3a as web or support material. Feeder rollers feed the resin film 3a. A dust removing device 4 eliminates dust from a surface of the resin film 3a. A resin layer coater 5 coats the resin film 3a with coating liquid which contains resin for forming an orientation layer. A heater/drier zone 6 dries the coating liquid on the resin film 3a so as to form the orientation layer overlaid on the resin film 3a. See the above steps Nos. 1 and 2.

Then resin film 3b including a preliminary resin layer is obtained. A rubbing unit 9 is constituted by rubbing rollers 7, dust removing sections 8 for removing dust from the rubbing rollers 7, and the like. The resin film 3b is subjected to rubbing operation in the rubbing unit 9, so that the preliminary resin layer is processed and becomes an orientation layer 52. See the above step No. 3.

Resin film 3c having the orientation layer 52 after the rubbing process is transferred from the rubbing unit 9 into a dust removing device 10, which eliminates dust from a surface of the orientation layer 52. See the above step No. 4.

After the orientation layer 52 is cleaned, the resin film 3c is fed by feeder rollers. A liquid crystal layer coater 11 coats the orientation layer 52 with coating solution including a liquid crystalline compound. See the above step No. 5. Then solvent is evaporated according to the above step No. 6. The resin film 3c travels into a thermal treating zone 12. The coating solution is heated by the thermal treating zone 12 to a phase forming temperature, to form a liquid crystal layer 50. See the above step No. 7. Note that the thermal treating zone 12 also evaporates remainder of the solvent included in the coating solution.

Then an ultraviolet lamp 13 as curing unit is driven to apply ultraviolet rays to the liquid crystal layer 50 for cross linking of the liquid crystal layer 50. See the step No. 8 above. For the purpose of the cross linking, the liquid crystalline compound to be used must have a cross linking functional group. If a liquid crystalline compound without the cross linking functional group is used, there is no step of applying ultraviolet rays. The liquid crystal layer 50 is cooled down immediately. It is necessary to cool the liquid crystal layer 50 in a very short time, for the purpose of avoiding changes in liquid crystalline phase. This being so, an optical compensatory sheet 3d is obtained in a form with the orientation layer 52 and the liquid crystal layer 50. An inspector 14 inspects the surface of the optical compensatory sheet 3d by measuring optical characteristics of the optical compensatory sheet 3d. After the inspection, a laminator 15 laminates protector film 16 on the surface of the liquid crystal layer 50. A winder 17 winds the optical compensatory sheet 3d with the protector film 16.

In the present embodiment, the steps from the forming of the preliminary resin layer to the sheet winding are consecutive after one another. Alternatively, the resin film 3b including the preliminary resin layer may be previously prepared in a roll form, and used for producing an optical compensatory sheet. In FIG. 2, a film roll 5b is loaded in a web supply device 1b, which supplies the resin film 3b including the preliminary resin layer. The steps including the rubbing step and those succeeding thereto are the same as those according to FIGS. 1A and 1B.

The steps Nos. 1-9 are carried out in series by the construction of FIGS. 1A and 1B. Also, it is possible to define two series, one including an earlier part of the steps Nos. 1-9 and the other including a later part of the steps Nos. 1-9 as illustrated in FIG. 2. Furthermore, the step of forming the orientation layer may be separate. The rubbing step and the liquid crystal layer forming step may be separate. Of course, the steps Nos. 1-9 may be totally separate from one another.

Figure 3A:
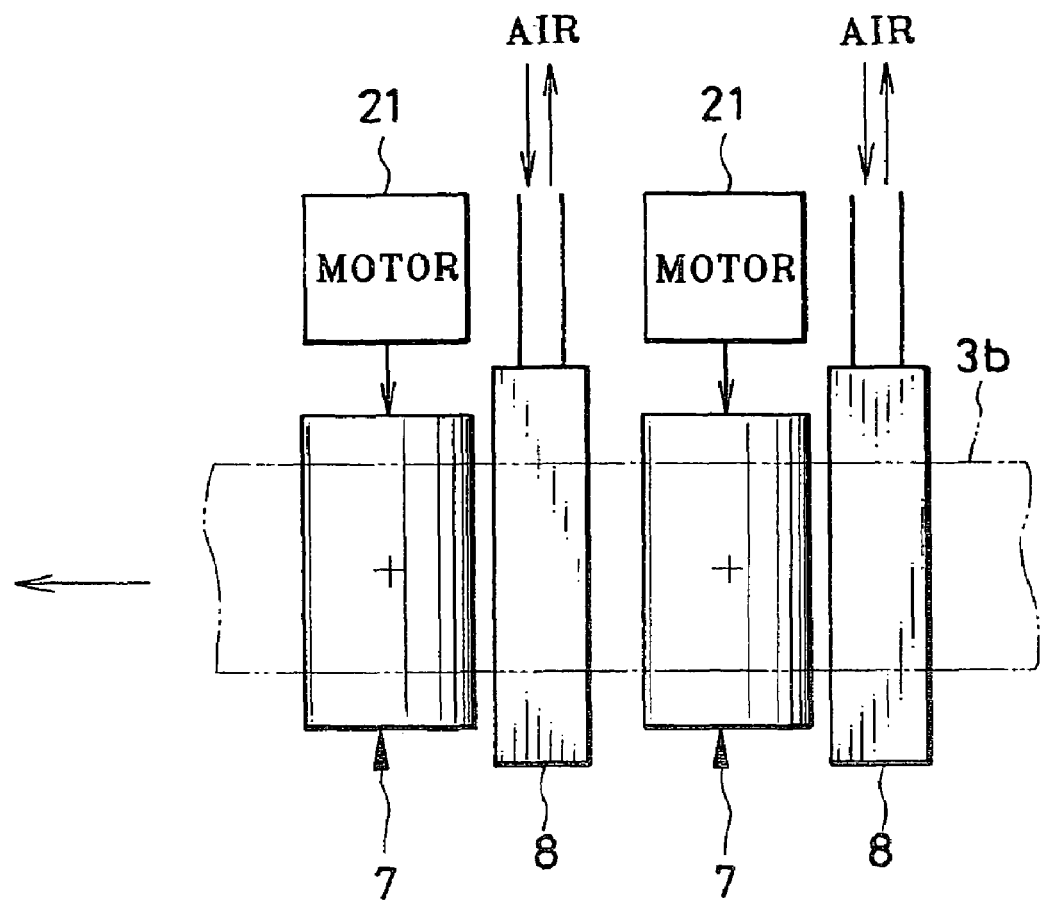
FIG. 3A is a plan illustrating a rubbing unit in the optical compensatory sheet producing apparatus.
Figure 3B:
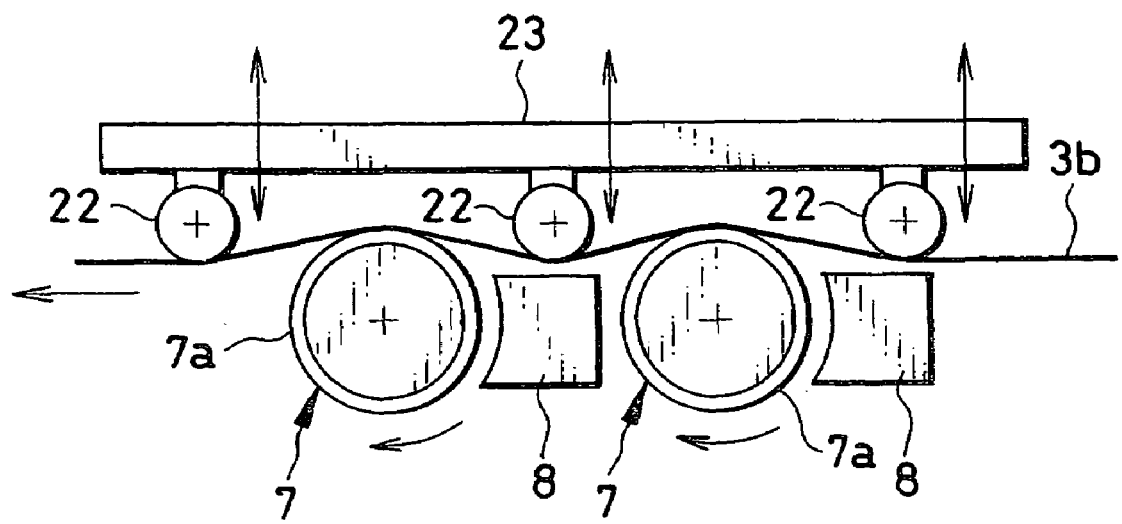
FIG. 3B is a side elevation illustrating the same as FIG. 3A.

In FIGS. 3A and 3B, the rubbing unit 9 is illustrated. FIG. 3A is a top plan of the rubbing unit 9. FIG. 3B is a front elevation. A guide roller 22 in FIG. 3B is not depicted in FIG. 3A.

A rubbing sheet 7a is provided in a periphery of the rubbing rollers 7, and may be formed from velvet, and rubs the surface of the preliminary resin layer to form the orientation layer 52. A motor 21 rotates the rubbing rollers 7 and is controlled in a speed of at most 1,000 rotations per minute. The rubbing rollers 7 are adjustable in an angle of its inclination with respect to the resin film 3b. To this end, the rubbing rollers 7 are supported in a pivotally movable manner about an axis that is defined vertical to the surface of the resin film 3b at its center line. Thus, a pivot about which the rubbing rollers 7 rotate or roll can be adjusted in its angle with respect to feeding of the resin film 3b.

A roller stage 23 supports the guide roller 22, which contacts an upper back surface of the resin film 3b, and keeps a lower front surface of the resin film 3b pressed on the rubbing rollers 7.

For a rubbing operation, the rubbing rollers 7 are moved pivotally about the axis being vertical to the resin film 3b. The resin film 3b is fed by a feeder at regular tension and a regular speed of at least 5 meters per minute. The rubbing rollers 7 are rotated at a regular speed in a direction against the feeding of the resin film 3b. Thus the rubbing rollers 7 operate continuously. The resin film 3b is fed in a hovering manner according to air foil effect. There occurs no shift of the resin film 3b in its width direction. The resin film 3b can be rubbed stably in a continuous manner.

During the rubbing, the resin film 3b is caused to travel at a speed of 10-50 m/min. A diameter of the rubbing rollers 7 is 100-500 mm, and preferably 80-200 mm. A rotational speed of the rubbing rollers 7 is 500-1,500 r.p.m. An angle of lap of the rubbing rollers 7 relative to the resin film 3b is 4-20 degrees. Tension of the rubbing rollers 7 applied to the resin film 3b is 1-2 N per 1 cm of the film width. The number of the rubbing rollers 7 is 2-4. A rotational axis of the rubbing rollers 7 is adjustable in a range of 0-45 degrees on a horizontal plane. To set and remove the rubbing rollers 7, it is desired to dispose a roller moving mechanism to keep the rubbing rollers 7 removable at a connection portion. Note that the angle of lap of the rubbing rollers 7 and tension of the rubbing rollers 7 to the resin film 3b is kept adjustable by the guide roller 22 moved up and down.

Examples of materials for the rubbing sheet 7a are sheets of rubber, nylon, polyester, a velvet sheet or other sheets of nylon fiber, rayon fiber, polyester fiber, sheets of paper, gauze and felt, and the like. A relative speed between the orientation layer 52 and the rubbing sheet 7a is 50-1,000 m/min, preferably 100-500 m/min.

While the rubbing rollers 7 rub the resin film 3c, the dust removing sections 8 near to the rubbing rollers 7 clean the surface of the rubbing sheet 7a. An example of the dust removing sections 8 is an ultrasonic dust remover, which has a fan or blower for blow of compressed air being ultrasonically vibrated, and an exhaust opening for sucking and ejecting the air and dust.

Also, it is possible to use other structures for the rubbing unit 9 according to known techniques.

Figure 4:
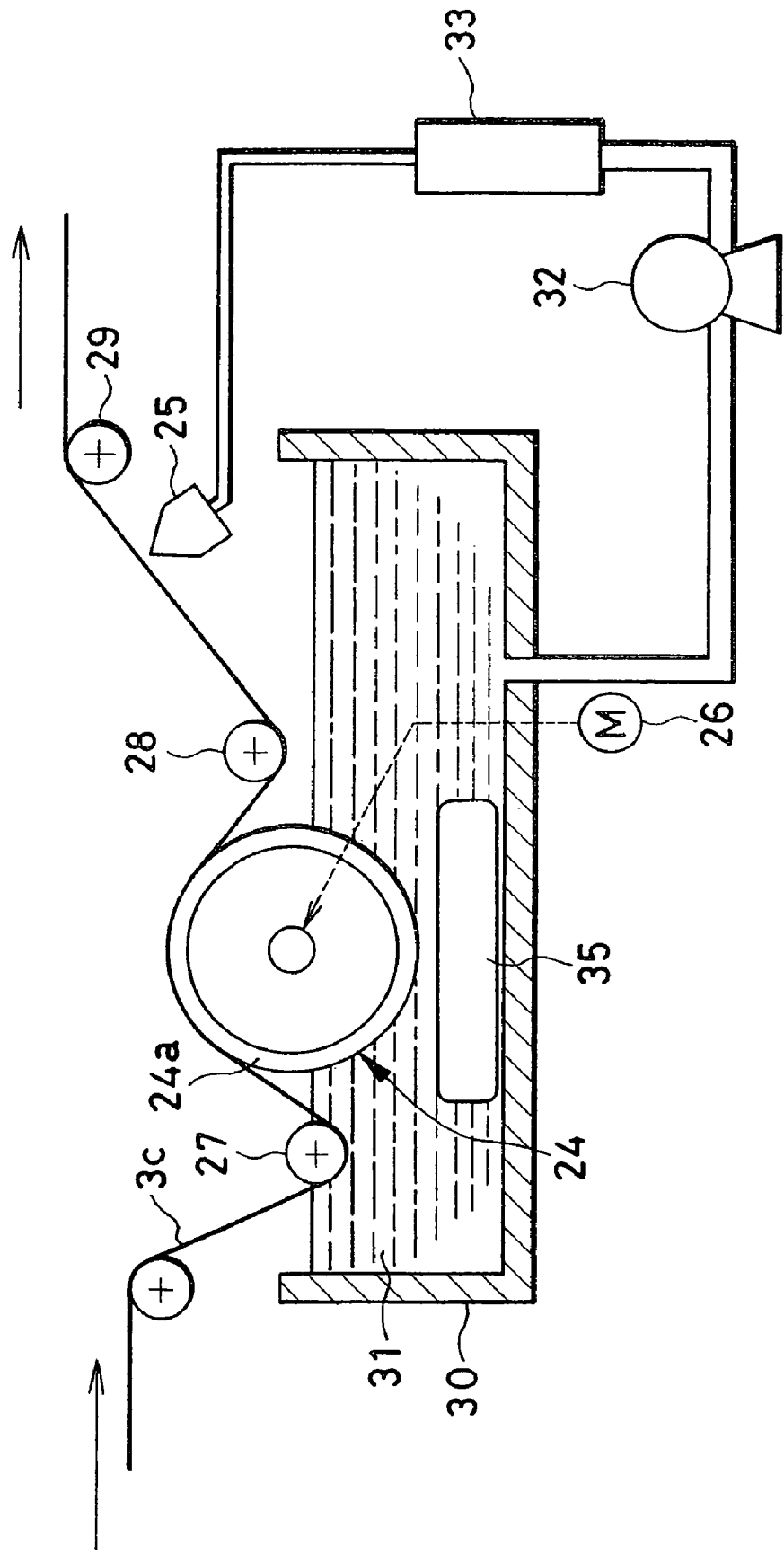
FIG. 4 is an explanatory view illustrating a dust remover units.

In FIG. 4, the dust removing device 10 of the invention is illustrated. The resin film 3c after being rubbed travels toward the right in the drawing. Travel of the resin film 3c depends on feeder rollers suitably disposed in the dust removing device 10. It is necessary that a cleaning roller 24 contacts the surface of the orientation layer 52 with a positive angle of lap. Also, a rinsing nozzle 25 should be so positioned that the polished surface of the orientation layer 52 comes near thereto.

In the dust removing device 10, guide rollers 27 and 28 guide the resin film 3c at the cleaning roller 24. A surface of the orientation layer 52 is kept in contact with an upper portion of the cleaning roller 24. A cleaning liquid bath 30 contains cleaning liquid 31, in which the resin film 3c is dipped by the guide roller 27. Rotation of the cleaning roller 24 cleans the surface of the orientation layer 52. There is another guide roller 29 toward which the resin film 3c moves with an inclination. The cleaning liquid 31 is sprayed or jetted by the rinsing nozzle 25 to the same surface of the resin film 3c, to rinse and clarify the orientation layer 52.

A motor 26 rotates the cleaning roller 24 in one direction. Approximately a lower half of the cleaning roller 24 is dipped in the cleaning liquid 31. When the cleaning roller 24 rotates, a thin layer of the cleaning liquid 31 occurs between the cleaning roller 24 and the orientation layer 52. The cleaning roller 24 polishes the orientation layer 52 without direct contact with the orientation layer 52. A circulating pump 32 sends the cleaning liquid 31 from the cleaning liquid bath 30. A filtration equipment 33 filters the cleaning liquid 31 from the circulating pump 32 before the rinsing nozzle 25 is supplied with the cleaning liquid 31. The rinsing nozzle 25 jets or sprays the cleaning liquid 31 to the orientation layer 52 at a suitable hydraulic pressure of liquid. Foreign matter deposited on the orientation layer 52, which is dust created in the course of the rubbing operation, is washed away.

The filtration equipment 33 clarifies the cleaning liquid 31 contaminated by dust or foreign matter eliminated from the resin film 3c. The cleaning liquid 31 after being filtered is sent to the rinsing nozzle 25.

Note that the cleaning roller 24 can rotate forwards or backwards relative to traveling of the resin film 3c. However, a diameter and rotational speed of the cleaning roller 24 should be preferably so determined that a difference between a speed of the resin film 3c and a peripheral speed of the cleaning roller 24 is 5 m/min or more.

Furthermore, it is possible that the cleaning roller 24 is stationary without rotation if the resin film 3c travels at a sufficiently high speed, which may be 5 m/min or more.

In a manner similar to the rubbing rollers 7, the cleaning roller 24 is movable pivotally about an axis that is perpendicular to the resin film 3c, and thus is adjustable in its inclination relative to the resin film 3c. To control the cleaning roller 24, it is desirable that an inclination of the cleaning roller 24 should be equal to that of the rubbing rollers 7 for the purpose of keeping the orientation of the orientation layer 52. A difference between the angles of the cleaning roller 24 and of the rubbing rollers 7 with reference to the resin film 3b is in a range of preferably ±15 degrees, desirably ±10 degrees, and most desirably ±5 degrees.

In FIG. 4, a resilient roll 24a covers a roller body of the cleaning roller 24 to project the orientation layer 52 from being scratched. In the cleaning roller 24, the resilient roll 24a has a thickness equal to or more than 0.5 mm, preferably 0.5-100 mm, and desirably 1.0-50 mm. Any suitable material may be used to produce the resilient roll 24a. Examples of the material for the resilient roll 24a are polyamides (such as 6-nylon, 66-nylon, and copolymer nylon), polyesters (such as polyethylene terephthalate, polybutylene terephthalate, and copolymer polyester), polyolefins (such as polyethylene and polypropylene), polyvinyl halide (such as polyvinyl chloride, poly vinylidene fluoride, and Teflon), natural rubber, neoprene rubber, nitrile rubber, Nordel, Viton rubber, Hypalon, polyurethane, rayon, cellulose, and the like.

Examples of materials for the resilient roll 24a may have a structure formed from a single material, mixed structure, layered structure, a structure of woven fabric with fibers, and a non-woven structure as a non-woven fabric. Conditions of preferable materials include a characteristic not being softened or dissolved by the cleaning liquid 31, and also a lower hardness than that of the surface of the resin film 3c with the orientation layer 52.

An angle of lap of the resin film 3c to the cleaning roller 24 is determined according to disposition of the guide rollers 27 and 28. If the angle of lap is determined greater, this is effective in efficient polishing because of longer time for passage of the resin film 3c at the cleaning roller 24. However, the angle of lap should be not too great in view of preventing wrinkles, scratches and zigzag movement. It is concluded that the angle of lap is determined equal to or less than 180 degrees, preferably 1-135 degrees and desirably 5-90 degrees. Also, if a diameter of the cleaning roller 24 is determined greater, this also prolongs time for passage of the resin film 3c at the cleaning roller 24. According to the preferred embodiment, the diameter of the cleaning roller 24 is equal to or less than 200 cm, preferably 5-100 cm and desirably 10-50 cm in view of a size of its space and a manufacturing cost.

A pressure of the cleaning roller 24 to the resin film 3c per unit area depends upon tension applied by a film feeding mechanism and a roll diameter of the cleaning roller 24. It is preferable to control the tension of the feeding mechanism because the roll diameter changes according to the above-mentioned contacting time. To eliminate foreign matter, it is preferable to keep the pressure high. If the pressure is too high, a thin layer of the cleaning liquid 31 between the orientation layer 52 and the cleaning roller 24 is likely to be interrupted partially. This causes scratches to occur in the resin film 3c due to a direct contact between the resilient roll 24a and the resin film 3c. Thus, the pressure of the cleaning roller 24 to the resin film 3c is preferably equal to or less than 100 kgf/m per unit width, desirably in a range of 5-100 kgf/m per unit width, and most desirably in a range of 5-50 kgf/m per unit width.

Furthermore, a plurality of cleaning rollers 24 may be used specifically when the resin film 3c is considerably contaminated. The rinsing nozzles 25 may be disposed in an alternate manner with the cleaning rollers 24. Alternatively, a series of the plural cleaning rollers 24 can be arranged upstream from one or more rinsing nozzles 25.

In the structure of FIG. 4, the cleaning liquid 31 is sent from the cleaning liquid bath 30 to the rinsing nozzle 25 and poured again to the cleaning liquid bath 30 in a circulating manner. Alternatively, a filtration equipment may be associated with the cleaning liquid bath 30 for clarifying the cleaning liquid 31 contaminated by dust in a separate manner from the structure including the rinsing nozzle 25. The filtration equipment preferably includes a filter of which a great number of regularly arranged minute openings have a size determined in consideration of a size of foreign matter to be eliminated. A nominal size of the minute openings is preferably at most a half as great as that of foreign matter, and desirably from $1/10$ to $1/2$ of that of foreign matter. As a filter, a cartridge filter of a pleat folded type can be used because of its long life and great ease in handling.

A filtering circulated flow rate should be determined so as not to increase dust in the cleaning liquid bath 30 due to cleaning of the resin film 3c. To measure a quantity of the dust flowing in the cleaning liquid 31, it is effective and easy to use HIAC/ROYCO liquid fine particle counter Model 4100 (trade name) manufactured by Nozaki Industry Inc. A size of minute openings in the filtration equipment 33 and the circulated flow rate can be adjusted so as not to increase the size of particles to be removed with time in operation of circulation.

An ultrasonic vibrator 35 is disposed in the cleaning liquid bath 30 and directed to the cleaning roller 24. The ultrasonic vibrator 35 applies ultrasonic waves to the cleaning roller 24, and ultrasonically eliminates dust from the cleaning roller 24 efficiently.

As viewed in the axial direction of the cleaning roller 24, a size of the ultrasonic vibrator 35 is greater than that of the cleaning roller 24. As viewed in a traveling direction of the resin film 3c, an area of projection of the ultrasonic vibrator 35 is preferably at least 50% as large as a diameter of the cleaning roller 24. Instead, it is possible to use a small size of the ultrasonic vibrator 35 under this condition. Plural ultrasonic vibrators of such a small type can be used desirably, to cover the same area of projection. An interval between the plural ultrasonic vibrators should determined so as to overlap wave zones on one another in a regularized manner.

Frequency of the ultrasonic vibrator 35 may be from 20 kHz to 1 MHZ or more. If the material of the resilient roll 24a of the cleaning roller 24 has a characteristic weak to cavitation or erosion, damages are likely to occur in a surface of the resilient roll 24a when the frequency is 500 kHz or less. So it is desirable to use a high-quality type of ultrasonic vibrator 35 of which frequency is 1 MHZ or more. In general, a particle size of foreign matter to which ultrasonic waves are effective change according to changes in the frequency. If the frequency is high, the ultrasonic waves are effective to relatively small foreign matter. Accordingly, it is preferable in the invention to use plural ultrasonic vibrators for ultrasonic waves of different frequencies. Also, the ultrasonic vibrator 35 may be a frequency variable type.

Preferably, an output of the ultrasonic waves per unit area is 0.1-2 W/cm². There is an optimum distance between the ultrasonic vibrator 35 and the cleaning roller 24 because of existence of standing waves. The optimum distance is preferably a product of λ and an integer, where λ is a wavelength of the ultrasonic wave transmitted in the cleaning liquid 31. Note that the wavelength λ is obtained according to the equation indicated below, where C is a speed of transmission of the ultrasonic waves in the cleaning liquid 31, and f is frequency of the ultrasonic vibrator 35.

$$\lambda = C/f$$

Temperature of the cleaning liquid 31 in the cleaning liquid bath 30 becomes higher because of generation of heat from the ultrasonic vibrator 35 or the circulating pump 32. Thus, the cleaning liquid bath 30 should have a device for keeping the temperature unchanged in the cleaning liquid 31. For example, the cleaning liquid bath 30 can have a jacket structure for circulating heating medium or suitable fluid. Also, a heat exchanger can be disposed in the cleaning liquid 31 for circulating heating medium or fluid.

Figure 5:
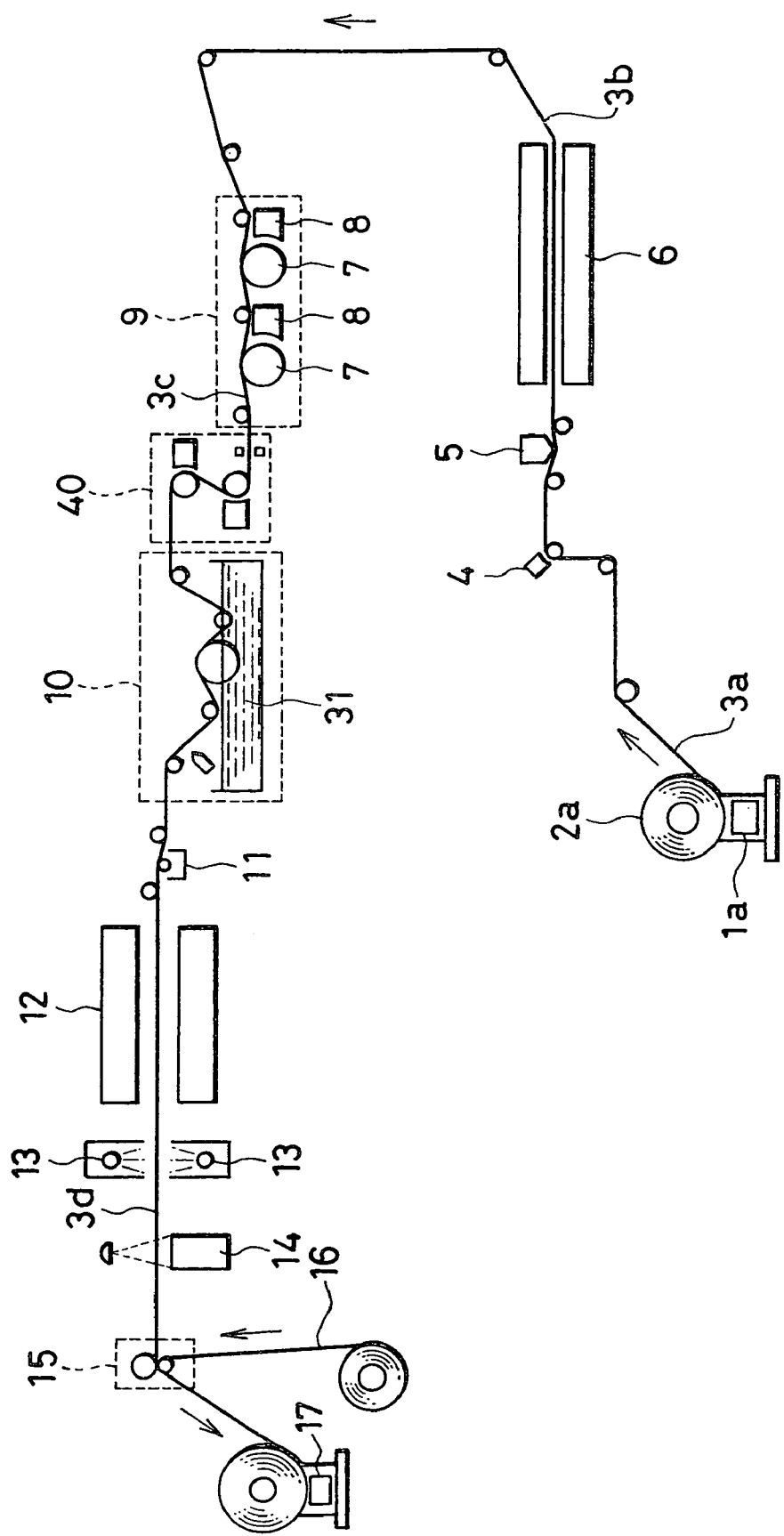
FIG. 5 is an explanatory view in elevation, illustrating another preferred optical compensatory sheet producing apparatus having an additional dust remover.

In FIG. 5, another preferred embodiment is depicted, in which a dry type of dust removal is added. There is a dry type of dust removing device 40 disposed between the rubbing unit 9 and the dust removing device 10 for removing foreign matter from the surface of the resin film 3c in a dry manner. Elements in FIG. 5 similar to those of FIGS. 1A and 1B are designated with identical reference numerals.

The dust removing device 40 is preferably an ultrasonic dust remover which supplies compressed air vibrated ultrasonically, and also sucks dust or foreign matter. An example of the ultrasonic dust remover is New Ultra Cleaner (trade name) type UVU-W manufactured by Shinko Co., Ltd.

Figure 6:
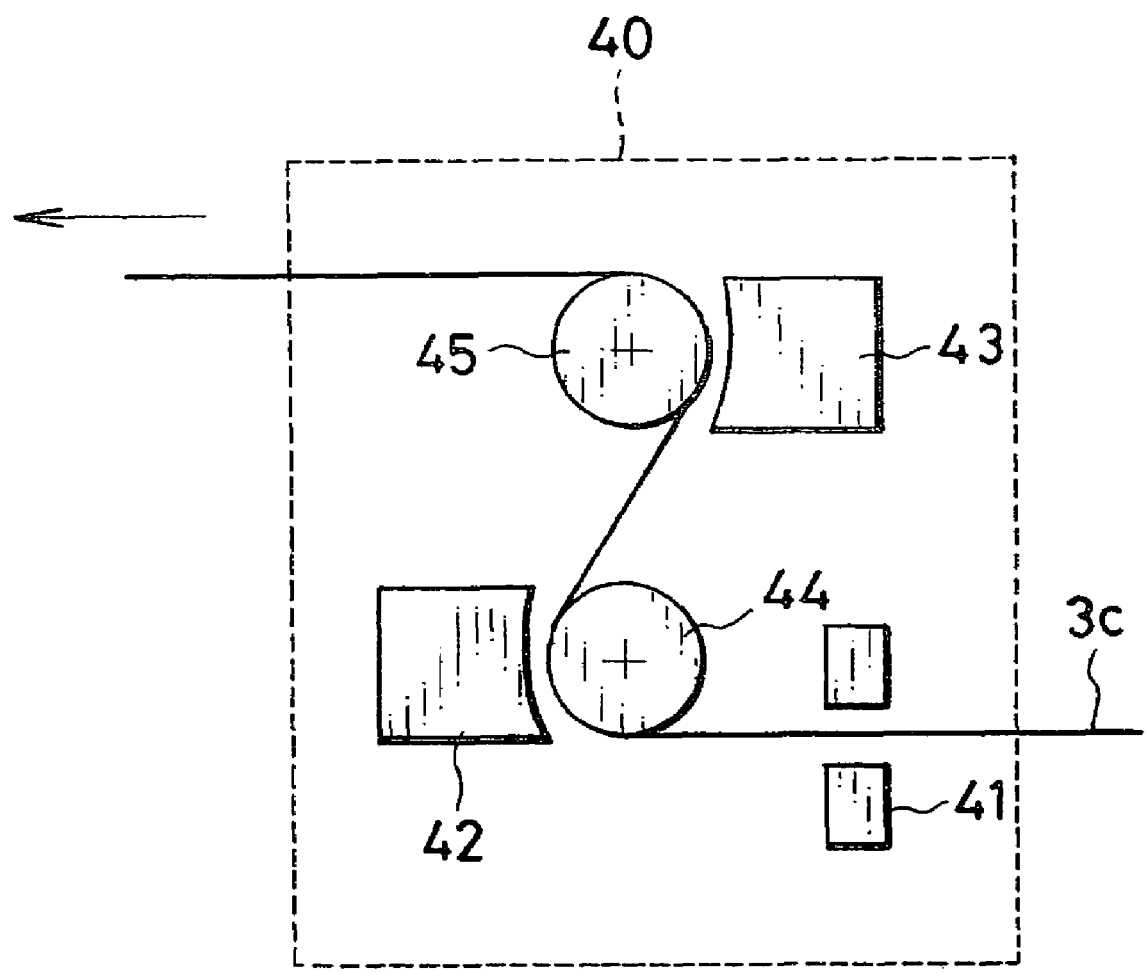
FIG. 6 is an explanatory view in elevation, illustrating the dust remover in the apparatus of FIG. 5.

In FIG. 6, a structure of the dust removing device 40 is depicted. The dust removing device 40 includes a static eliminator 41, a front surface dust removing section 42, a rear surface dust removing section 43 and backup rollers 44 and 45. The backup rollers 44 and 45 are opposed respectively to the dust removing sections 42 and 43, and support and guide the resin film 3c. The static eliminator 41 eliminates static charge from the resin film 3c after the rubbing operation, and makes it easy to remove dust from the resin film 3c.

The dust removing sections 42 and 43 blow the resin film 3c with compressed air vibrated ultrasonically, and suck dust. The front surface dust removing section 42 is directed to the orientation layer 52 or the front surface of the resin film 3c opposite to the backup roller 44, and cleans the orientation layer 52 in a manner of a dry type by blowing of the compressed air and suction.

The rear surface dust removing section 43 is directed to the back surface of the resin film 3c opposite to the orientation layer 52 in a position at the backup roller 45, and cleans the back surface of the resin film 3c in a manner of a dry type by blowing of the compressed air and suction.

A flow rate of the compressed air from the dust removing sections 42 and 43 is in a range of 10-50 m/sec, and preferably in a range of 10-30 m/sec. A distance from the backup rollers 44 and 45 to an end of the dust removing sections 42 and 43 is preferably 2-5 mm. A diameter of the backup rollers 44 and 45 is preferably 50-150 mm.

In FIG. 6, the dust removing device 40 effects dry removal of dust to both the orientation layer 52 and the back surface of the resin film 3c. However, the dust removing device 40 may clean only the orientation layer 52 without cleaning the back surface of the resin film 3c.

Any suitable transparent material may be used for the resin film 3a on which the orientation layer 52 is formed. The resin film 3a desirably has transmittance of 80% or more for visible light, and should have optical isotropy as viewed vertically. So the material for the resin film 3a should have a small index of birefringence. A preferable example of the material is cellulose triacetate. Also, material having a great index of birefringence may be used by suitably determining a condition in flow casting of solution, a condition in melt extrusion, a condition in stretch in vertical or horizontal directions, or the like. Examples of such materials are polycarbonate, polyarylate, polysulfone, polyether sulfone and the like.

To form synthetic resin into a sheet, it is general to add plasticizer to the resin to improve physical characteristics of the resin, for example, to facilitate the forming, and to increase flexibility and resistance to heat. It is well-known that preferred examples of plasticizers have similarity in chemical structure, and have high compatibility. In combination with cellulose triacetate, preferable examples of plasticizers are phthalate ester, phosphate ester, ester of glycol, and the like.

It is further preferable to provide an undercoat layer on the resin film 3a for the purpose of increasing strength in adhesion between the resin film 3a and the preliminary resin layer. An example of method of forming the undercoat layer is disclosed in U.S. Pat. No. 5,583,679 (corresponding to JP-B 2,587,398, JP-A 8-050206), which also discloses examples of material for the undercoat layer. Furthermore, the optical compensatory sheet can be used as a protector film for a polarizing plate as disclosed in EP-A 0 911 656.

The preliminary resin layer for forming the orientation layer may be formed from any suitable material that is transparent and can be oriented when processed for orientation. Examples of materials for the preliminary resin layer are polymethyl methacrylate, acrylic acid/methacrylic acid copolymer, styrene/maleinimide copolymer, polyvinyl alcohol, denatured polyvinyl alcohol, poly(N-methylolacrylamide), styrene/vinyl toluene copolymer, chlorosulfonated polyethylene, nitrocellulose, polyvinyl chloride, chlorinated polyolefin, polyester, polyimide, vinyl acetate/vinyl chloride copolymer, ethylene/vinyl acetate copolymer, carboxymethyl cellulose, polyethylene, polypropylene, and polycarbonate. Organic substances such as silane coupling agents may be employed together with the polymer. Particularly preferable examples of polymers for the preliminary resin layer are polyimide, polystyrene, styrene derivative polymer, gelatine, polyvinyl alcohol, denatured polyvinyl alcohol, and polyvinyl alcohol derivative. Specifically, the preliminary resin layer can be formed from material having polymerizable groups for the purpose of strengthening the joining with the liquid crystal layer, as disclosed in JP-A 9-152509.

Among those polymers, polyvinyl alcohol and denatured polyvinyl alcohol are preferred. The polyvinyl alcohol generally has saponification degree in the range of 70-100%, preferably in the range of 80-100%, and especially in the range of 85-95%. A polymerization degree of this is preferably in the range of 100-3,000.

Examples of the denatured polyvinyl alcohols include polyvinyl alcohols denatured by copolymerization having a group such as —COONa, —Si(OX)$_3$ [X: hydrogen or halogen], —N(CH$_3$)$_3$Cl, C$_9$H$_{19}$COO—, —SO$_3$Na or —C$_{12}$H$_{25}$, polyvinyl alcohols denatured by incorporation of chain transfer agent employed in copolymerization having a terminated group such as —COONa, —SH or —C$_{12}$H$_{25}$, and polyvinyl alcohols denatured by block-copolymerization having a group such as —COOH, —CONH$_2$, —COOR [R: alkyl] or —C$_6$H$_5$. A polymerization degree of those is preferably in the range of 100-3,000.

Among those, preferable examples are non-denatured polyvinyl alcohol and denatured polyvinyl alcohol with a saponification degree in the range of 80-100%. Desirable examples are non-denatured polyvinyl alcohol and denatured polyvinyl alcohol having alkylthio group (C$_{12}$H$_{25}$S—) with a saponification degree in the range of 85-95%. Available examples of this polyvinyl alcohol having an alkyl group at a side chain are MP 103, MP 203, R 1130 (trade names) and the like manufactured by Kuraray Co., Ltd. Also, cross linking agents disclosed in U.S. Pat. No. 5,631,051 (corresponding to JP-A 8-338913) can be added preferably.

In view of reliable quality in an optical compensatory sheet, it is important that the cleaning liquid 31 should have characteristics not to dissolve any substance in the resin film 3c, extract any substance from the resin film 3c, or permeate into the resin film 3c, the substance being any one of the orientation layer overlaid on the resin film 3a, the resin in the resin film 3a, and the undercoat layer of the resin film 3c.

If water-soluble polymer such as gelatine and polyvinyl alcohol is used to form the undercoat layer or orientation layer, it is necessary to use non-aqueous solvent with low polarity. To control microscopic corrugation of a surface of the orientation layer after the rubbing treatment is essential to operation of regularly orienting a liquid crystalline compound overlaid thereon. It is necessary to consider mobility of polymer chains on the surface and glass transition in a state of coexistence of molecules of the solvent, which are not explicable as macroscopic phenomena of dissolution, swell or the like. Thus, it is not always possible to use water or other solvent with high polarity even when the preliminary resin layer is non-aqueous polymer, such as polymethyl methacrylate, styrene/maleinimide copolymer, styrene/vinyl toluene copolymer, polyvinyl chloride, polyester, polyimide, polyethylene, polypropylene and polycarbonate.

As materials for forming the preliminary resin layer includes hydrocarbons at backbone chains and side chains, it is effective to use fluorine type solvent or siloxane type solvent as the cleaning liquid 31. This is because those are not compatible with hydrocarbon, and are not harmful to an orderly structure of molecules of the surface to be processed by the rubbing operation. Examples of fluorine types include perfluorocarbon, of which the number of carbon atoms is 6-12, preferably 7-10. Should the number of carbon atoms of perfluorocarbon be too small, there is permeation of the cleaning liquid 31 to the orientation layer. In contrast, should the number of carbon atoms be too great, the cleaning liquid 31 has a very high boiling point inconsistent to quick drying after cleaning. Available examples of perfluorocarbons are PF-5060 (6 carbon atoms), PF-5070 (7 carbon atoms), and PF-5080 (8 carbon atoms) which are manufactured by Sumitomo 3M Co., Ltd.

Among fluorine types of solvents, perfluorocarbon can provide the most stable rubbed surface, as all the hydrogen atoms have been replaced by fluorine. It is likely that hydro fluorocarbon and chlorofluorocarbon does not obtain desired orientation of the liquid crystalline compound. The hydro fluorocarbon has hydrogen groups in a partial manner. The chlorofluorocarbon has chlorine by partial substitution. Those are likely to lower regularity in microscopic orderly corrugation on the surface of the orientation layer according to contact time with the cleaning liquid 31 or the temperature of the cleaning liquid 31.

Also, the cleaning liquid 31 of the invention can be a siloxane type solvent. In consideration of a higher boiling point of the siloxane type solvent than that of perfluorocarbon, preferred examples of siloxane type solvents should have 2-4 silicon atoms. Preferred examples of substituent groups include methyl group, ethyl group and propyl group. The most preferable example has a structure produced by substituting methyl groups for all the hydrogen atoms. Available examples of siloxane type of cleaning liquid 31 are FRD-10 and FRD-20 which are manufactured by Toshiba Corporation.

The liquid crystal layer, formed on the orientation layer after the dust removal of the wet type, is a layer which has a negative birefringence, and which is obtained by cooling and hardening a discotic liquid crystalline compound after orientation of the same, or by polymerizing (curing) a discotic liquid crystalline compound which is polymerizable. Examples of the discotic compounds include:

benzene derivatives described in C. Destrade et al., Mol. Cryst., vol. 71, p. 111, 1981;

truxene derivatives described in C. Destrade et al., Mol. Cryst., vol. 122, p. 141. 1985 and Physics lett. A, vol. 78, p. 82, 1990;

cyclohexane derivatives described in B. Kohne et al., Angew. Chem., vol. 96, p. 70, 1984;

macrocyclic compounds of azacrown-type or phenylacetylene-type described in J. M. Lehn et al., J. Chem. Commun., p. 1794, 1985, and in J. Zhang et al., J. Am. Chem. Soc., vol. 116, p. 2655, 1994.

The discotic liquid crystal generally has a structure that the above compound is located at a center of the crystal as a parent core and further straight chain groups such as alkyl, alkoxy and benzoyl having a substituent are radially bonded to the compound. Also, the discotic liquid crystal has a crystalline characteristic. Furthermore, it is possible to use a compound of which a molecule has a negative uniaxial property (negative birefringence) and which can be provided with regular orientation. In the present specification, forming by use of the discotic compound does not mean that a final product is discotic. For example, the discotic liquid crystal of a low molecular weight may have groups reacting in response to application of heat or light. Reaction of the groups may cause polymerization or cross linking to lose a liquid crystalline characteristic.

In a process of producing the liquid crystal layer 50 of a discotic nematic phase, at first a discotic compound and other compounds are dissolved in solvent to obtain solution. The orientation layer 52 is coated with the solution and dried, and then heated to temperature of forming the discotic nematic phase. After this, the dried solution is cooled in keeping the discotic nematic phase or the oriented state, before the liquid crystal layer 50 can be obtained. In a variant process of producing the liquid crystal layer 50, the discotic compound and other compounds (and also polymerizable monomer and photo polymerization initiator) are dissolved in solvent to obtain solution. The orientation layer 52 is coated with the solution and dried, and then heated to temperature of forming the discotic nematic phase, and polymerized by ultraviolet rays or the like. After this, the dried solution is cooled to obtain the liquid crystal layer 50. A temperature of transfer between the discotic nematic liquid crystalline phase and solid phase of the discotic compound is 70-300° C., and preferably 70-170° C. according to the invention. Orientation of the discotic compound is the bend-hybrid orientation disclosed in U.S. Pat. No. 5,583,679 (corresponding to JP-B 2,587,398, JP-A 8-050206).

A tilt angle at the time of orientation of a discotic compound on the side of the support can be determined by designation of a material for the discotic compound or orientation layer, or by determining the method of the rubbing treatment. An angle of an inclination of a discotic unit on the side of an outer surface (air) can be determined by designation of a discotic compound or additional compounds used together with the discotic compound, the additional compounds including plasticizers, surface active agents, polymerizable monomers, polymers and the like.

The plasticizers, surface active agents and polymerizable monomers may be any suitable compounds that are compatible with a discotic compound, and can provide the tilt angle of the discotic liquid crystalline compound, or is not harmful to orientation. Among those, polymerizable monomers are preferable in particular, including compounds having a vinyl group, vinyl oxy group, acryloyl group and methacryloyl group Each of those compounds is used at 1-50 wt. %, preferably 5-30 wt. % relative to the discotic compound.

For the above polymers, any type may be used if it has a compatibility with the discotic compound, and can provide a tilt angle for the discotic liquid crystalline compound. A preferable example of the polymer is cellulose ester. Examples of cellulose esters are cellulose acetate, cellulose acetate propionate, hydroxy propyl cellulose, cellulose acetate butylate, and the like. Those polymers are used at a ratio of 0.1-10 wt. %, preferably 0.1-8 wt. %, desirably 0.1-5 wt. % to an amount of the discotic compound so as not to block orientation of the discotic liquid crystalline compound.

Coating solution for forming the liquid crystal layer of the discotic nematic phase can be produced by dissolving the discotic compound and above-mentioned other compounds in solvent. Examples of the organic solvents are polar solvents (such as N,N-dimethylformamide (DMF), dimethyl sulfoxide (DMSO), and pyridine), non-polar solvents (such as benzene and hexane), alkyl halides (such as chloroform and dichloromethane), esters (such as methyl acetate and butyl acetate), ketones (such as acetone and methyl ethyl ketone), and ethers (such as tetrahydrofuran and 1,2-dimethoxyethane). Specifically, alkyl halides and ketones are preferable. Each of those types of solvents may be used in a single manner, or may be used in combination with others.

The optical compensatory sheet obtained by the above method can be free from defects in a liquid crystal layer due to dust (existence of an excessively large particle in the liquid crystal layer, and irregularity in the orientation). When the optical compensatory sheet is mounted in a liquid crystal display unit (LCD), an angle of view according to the liquid crystal layer can be enlarged. There occurs no defects in the image.

EXAMPLES

Samples of optical compensatory sheets were produced according to the present invention, and evaluated in comparison with comparative examples, as described hereinafter. Of course, the present invention is also applicable to constructions other than the samples herein described.

Comparative Example 1

Prior Art

1. Production of the Transparent Resin Film

[Forming of a transparent support material] Substances indicated below were poured into a mixing tank, and stirred and heated to produce cellulose acetate solution.

| | |
|---|---|
| cellulose acetate at an acetylation ratio of 60.9%: | 100 parts by weight |
| triphenyl phosphate: | 7.8 parts by weight |
| biphenyl diphenyl phosphate: | 3.9 parts by weight |
| methylene chloride: | 300 parts by weight |
| methanol: | 54 parts by weight |
| 1-butanol: | 11 parts by weight |

One other mixing tank was used, and supplied with the following compounds, which were heated and stirred to produce retardation booster agent solution.

| | |
|---|---|
| 2-hydroxy-4-benzyl oxy benzophenone: | 12 parts by weight |
| 2,4-benzyl oxy benzophenone: | 4 parts by weight |
| methylene chloride: | 80 parts by weight |
| methanol: | 20 parts by weight |

474 parts by weight of cellulose acetate solution was mixed with 22 parts by weight of retardation booster agent solution, and was stirred sufficiently to obtain dope. Note that 100 parts by weight of cellulose acetate was mixed with 3 parts by weight of retardation booster agent. The dope was ejected through a flow opening, and extended on a drum cooled at 0° C., then was peeled in a state of including the solvent at 70 wt. %. Lateral portions of the film as viewed crosswise to the feeding were fixed by a bin tenter machine. The film was dried in keeping such an interval as to set an extension proportion of 3% as viewed crosswise to the feeding direction in a range where the solvent is included at 3-5 wt. %. The film was dried further by feeding between rollers in the thermal treating device, and was so treated to have an extension proportion of substantially 0% in the feeding direction, and a ratio 0.75 between extension proportions in the feeding direction and in a direction crosswise to the same in a zone where the glass transition temperature is 120° C. or higher. (The ratio 0.75 was determined in consideration of 4% extension in the feeding direction upon a peeling operation.) Thus, the cellulose acetate film with a thickness of 107 μm was obtained. Retardation of the film was measured. The film had a retardation Rth=80 nm in the thickness direction, and a retardation Re=11 nm as viewed in a surface.

[Forming of $1^{st}$ undercoat layer] The cellulose acetate film obtained above was used as transparent support material, which was coated with coating solution having composition indicated below at 28 ml/m², so that a first undercoat layer was formed by drying the coating solution.

| | |
|---|---|
| Gelatine: | 5.42 parts by weight |
| formaldehyde: | 1.36 parts by weight |
| salicylic acid: | 1.6 parts by weight |
| acetone: | 391 parts by weight |
| methanol: | 158 parts by weight |
| methylene chloride: | 406 parts by weight |
| water: | 12 parts by weight |

[Forming of $2^{nd}$ undercoat layer] The first undercoat layer was coated with coating solution having composition indicated below at 7 ml/m², so that a second undercoat layer was formed by drying the coating solution.

Figure 7:
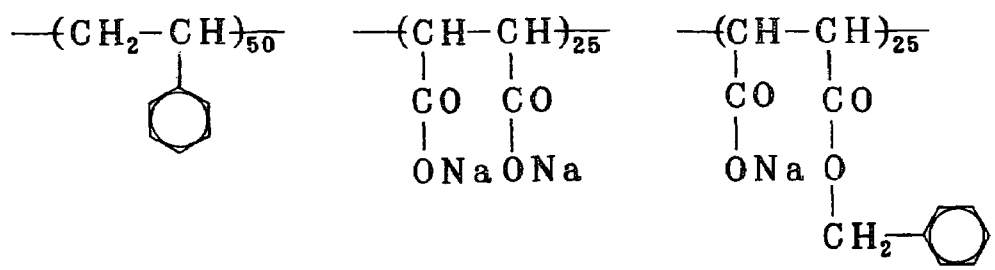
FIG. 7 illustrates a structure of anionic polymer.

| | |
|---|---|
| anionic polymer having a structure of FIG. 7: | 0.79 part by weight |
| mono ethyl citrate ester: | 10.1 parts by weight |
| acetone: | 200 parts by weight |
| methanol: | 877 parts by weight |
| water: | 40.5 parts by weight |

[Forming of back layer] A surface of the transparent support material opposite to the above coating was coated with coating solution having composition indicated below at 25 ml/m², so that a back layer was formed by drying the coating solution. The transparent resin film or resin film 3a was finally obtained.

| | |
|---|---|
| Cellulose diacetate at an acetylation ratio of 55%: | 6.56 parts by weight |
| silica type of mat agent (particles with average diameter of 1 μm): | 0.65 part by weight |
| acetone: | 679 parts by weight |
| methanol: | 104 parts by weight |

2. Production of Orientation Layer and Liquid Crystal Layer.

Figure 8:
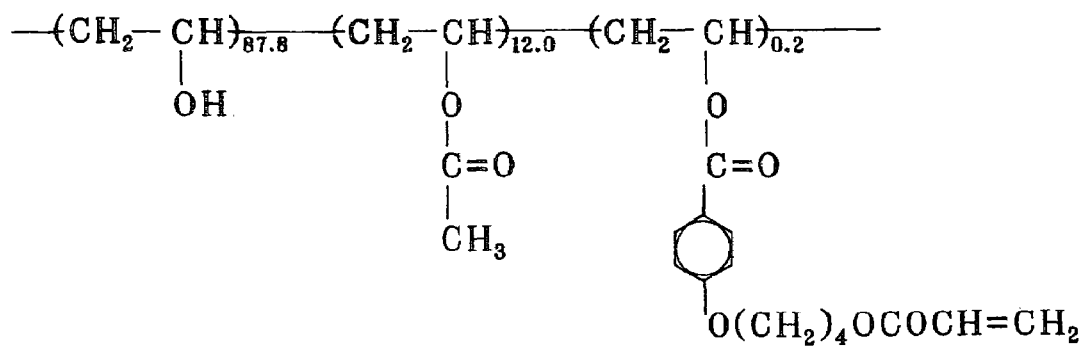
FIG. 8 illustrates a structure of alkyl modified polyvinyl alcohol.

[Forming of preliminary resin layer for forming orientation layer]. In using the above-described transparent resin film 3a, the second undercoat layer was coated with aqueous solution of alkyl modified polyvinyl alcohol, of which a structure is depicted in FIG. 8. A preliminary resin layer was formed on the transparent resin film by drying the solution with hot air at 60° C. for 90 seconds.

[Rubbing process] After the preliminary resin layer is formed, there was a rubbing process to form the orientation layer 52 by use of the rubbing unit 9 illustrated in FIGS. 3A and 3B. The resin film 3b with the preliminary resin layer is traveled continuously at a speed of 20 m/min. The guide roller 22 was 65 mm across. The rubbing rollers 7 were 150 mm across. The resin film 3b was guided by the guide roller 22. The rubbing rollers 7 were caused to rotate at 600 r.p.m. in reverse to traveling of the resin film 3b. During the rotation, the rubbing sheet 7a of velvet about the rubbing rollers 7 was in contact with the preliminary resin layer, and rubbed the same. In the rubbing, an angle of lap at the base was 6 degrees. Tension applied to the resin film 3b was 1.8 N/cm per unit width. An angle of a rotational axis of the rubbing rollers 7 was 0 degree with reference to the crosswise direction of traveling of the resin film 3b.

In the rubbing process, a surface of the rubbing sheet 7a in the rubbing rollers 7 was cleaned by the dust removing sections 8. Each of the dust removing sections 8 was New Ultra Cleaner (trade name) type UVU-W manufactured by Shinko Co., Ltd., and had a head pressure of 300 mmAq, a flow speed of 20 m/sec to blow with air, and a distance of 3 mm between a roll surface and an end of the cleaner.

[Dust removal in a dry manner] After the rubbing, the resin film 3c was subjected to dust removal in the dust removing device 40 depicted in FIG. 6. The static eliminator 41 eliminated static charge from the resin film 3c, before the dust removing sections 42 and 43 cleaned the orientation layer 52 and a back surface of the resin film 3c opposite to the orientation layer 52. Each of the dust removing sections 42 and 43 was provided with a New Ultra Cleaner (trade name) type UVU-W manufactured by Shinko Co., Ltd., and had a head pressure of 300 mmAq, a flow speed of 20 m/sec to blow with air, and a distance of 2 mm between an end of the cleaner and a surface of the backup rollers 44 and 45. The backup rollers 44 and 45 were 50 mm across.

Figure 9:
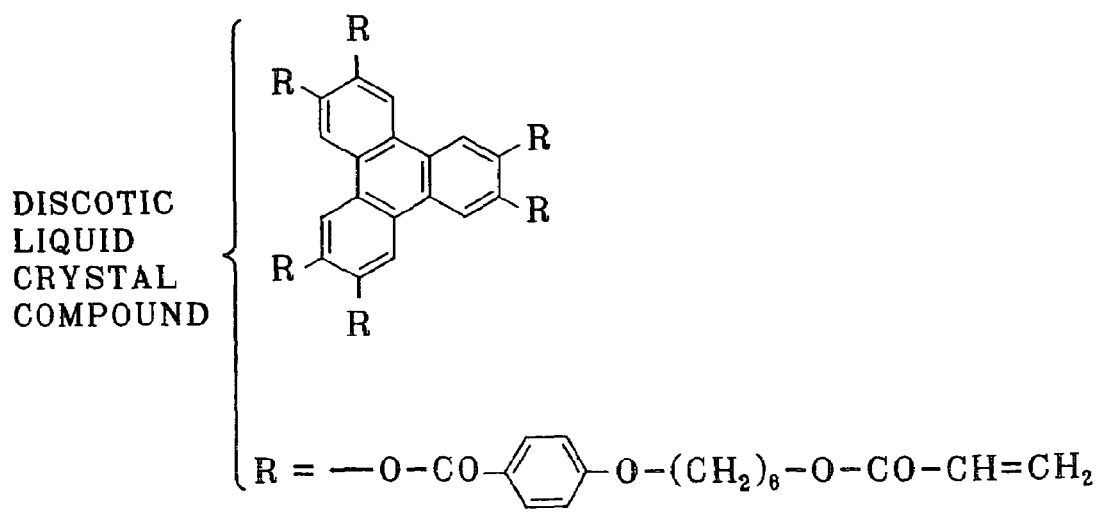
FIG. 9 illustrates a structure of a discotic liquid crystal compound.

[Forming of liquid crystal layer] After the dust removal of the dry type, the liquid crystal layer was formed on the orientation layer. Coating solution which was used for this had composition as follows:

| | |
|---|---|
| methyl ethyl ketone: | 20.67 grams |
| discotic liquid crystal DLC-A of FIG. 9: | 9.1 grams |
| ethylene oxide modified trimethylol propane acrylate V#360 manufactured by Osaka Organic Chemical Ind. Co., Ltd.: | 0.9 gram |
| Cellulose acetate butylate CAB 551-0.2 manufactured by Eastman Chemical Co.: | 0.2 gram |
| Cellulose acetate butylate CAB 531-1 manufactured by Eastman Chemical Co.: | 0.05 gram |
| Irgacure 907 (trade name) manufactured by Japan Ciba-Geigy: | 3.0 grams |
| Kayacure DETX (trade name) manufactured by Nippon Kayaku Co., Ltd.: | 0.1 gram |

The orientation layer was coated with the coating solution by a wire bar (#3 bar). The resin film was attached on a frame of metal, and heated for three minutes in a high temperature bath at 120° C. to orient the discotic liquid crystal. Then the discotic liquid crystal was subjected to ultraviolet rays for one minute by a high pressure mercury lamp still under 120° C. The resin film was left to stand and cooled down to the room temperature, to obtain a continuous type of optical compensatory sheet 3d in which the liquid crystal layer 50 was overlaid on the transparent resin film 3c.

The liquid crystal layer 50 was 1.4 μm thick. Retardation of the optical compensatory sheet 3d was measured in a direction of rubbing of the orientation layer. Average angle of the inclination of the optical axis was 15.5 degrees. The optical compensatory sheet had a retardation Rth=137 nm in the thickness direction, and a retardation Re=25 nm as viewed in a surface.

Sample 1

An optical compensatory sheet of the invention was produced in the same manner as Comparative Example 1 except for the dust removal. In the dust removal for Sample 1, a process at the dry type of dust removing device 40 was followed by a wet type of dust removal for the orientation layer 52 by use of the dust removing device 10 in FIG. 4. The cleaning roller 24 included an aluminum roller body and a resilient roll 24a of velvet disposed thereabout. The roller body was 550 mm long and 20 cm across. The resilient roll 24a was the same as the rubbing sheet 7a. Guide rollers were adjusted to set the angle of lap of the cleaning roller 24 at 0 degrees to a crosswise direction of the resin film 3c.

Also, positions of the guide rollers 27 and 28 were adjusted to have the angle of lap of 50 degrees to the resin film. The cleaning liquid 31 was perfluorocarbon PF-5080 (8 carbon atoms) manufactured by Sumitomo 3M Co., Ltd. The cleaning roller 24 was dipped in the cleaning liquid 31 at a depth of 10 cm, and caused to rotate in reverse to the traveling direction. The rinsing nozzle 25 had a clearance which was 500 mm long as viewed in the film width direction and 1 mm wide as viewed in the traveling direction, and supplied the cleaning liquid 31 at a flow speed of 30 liters per minute. The filtration equipment 33 included Astro Pore Filter (trade name) manufactured by Fuji Photo Film, Co., Ltd. The filter had a nominal size of the minute openings of 0.2 μm.

The single ultrasonic vibrator 35 manufactured by Japan Alex Corporation was used, disposed to extend crosswise to the traveling direction of the resin film 3c, and caused to emit ultrasonic waves to the whole range of the cleaning roller 24. The ultrasonic vibrator 35 was 50 cm long and 30 cm across, and emitted the ultrasonic waves of 100 kHz at the power of 1,000 W.

Comparative Example 2

An optical compensatory sheet was produced by the same processes as Sample 1 except for the type of the cleaning liquid 31 used in the dust removal of the wet type. The cleaning liquid 31 was perfluorocarbon PF-5050 (5 carbon atoms) manufactured by Sumitomo 3M Co., Ltd., instead of PF-5080 (8 carbon atoms).

Sample 2

An optical compensatory sheet of the invention was produced by the same processes as Sample 1 except for the type of the cleaning liquid 31 used in the dust removal of the wet type. The cleaning liquid 31 was a silicone type FRD-20 that is octamethyl trisiloxane manufactured by Toshiba Corporation, instead of PF-5080.

Comparative Example 3

The optical compensatory sheet was produced by the same processes as Sample 1 except for the inclination of the cleaning roller 24. A rotational axis of the cleaning roller 24 was inclined at 20 degrees relative to the width direction of the resin film.

To evaluate the samples and comparative examples, optical compensatory sheets were left to stand for one (1) hour. Then each sheet was observed through a microscope. If there are point-shaped defects being at least 10 μm across, then the number of the detects per unit area of 1 m² was counted and evaluated. Furthermore, each optical compensatory sheet was mounted in a liquid crystal display unit (LCD) of the TN type. In the LCD, a product, which was obtained by multiplying a gap size of liquid crystal cells by a difference in the refractive index between liquid crystal extraordinary light and normal light, was 370 nm. A twisted angle was 90 degrees. Then existence of defects in a visible state of display, was evaluated, as well as quality of display of an image with evenness without degradation in indication. Results are indicated in the table.

In the following table, the angle represents that defined by the rotational axis of the cleaning roller 24 relative to the width direction of the resin film.

|  | Cleaning Liquid | Angle (°) | Dust Particles (/m²) | Evaluation of Evenness in Display |
| --- | --- | --- | --- | --- |
| Comparative Example 1 | None | 0 | 35 | Good |
| Sample 1 | PF-5080 | 0 | 7 | Good |
| Comparative Example 2 | PF-5050 | 0 | 3 | Very Uneven |
| Sample 2 | FRD-20 | 0 | 8 | Good |
| Comparative Example 3 | PF-5080 | 20 | 5 | Locally Uneven |

Another preferred embodiment is described next, according to which a process of thermal treatment is capable of avoiding unevenness in application of heat.

Figure 10:
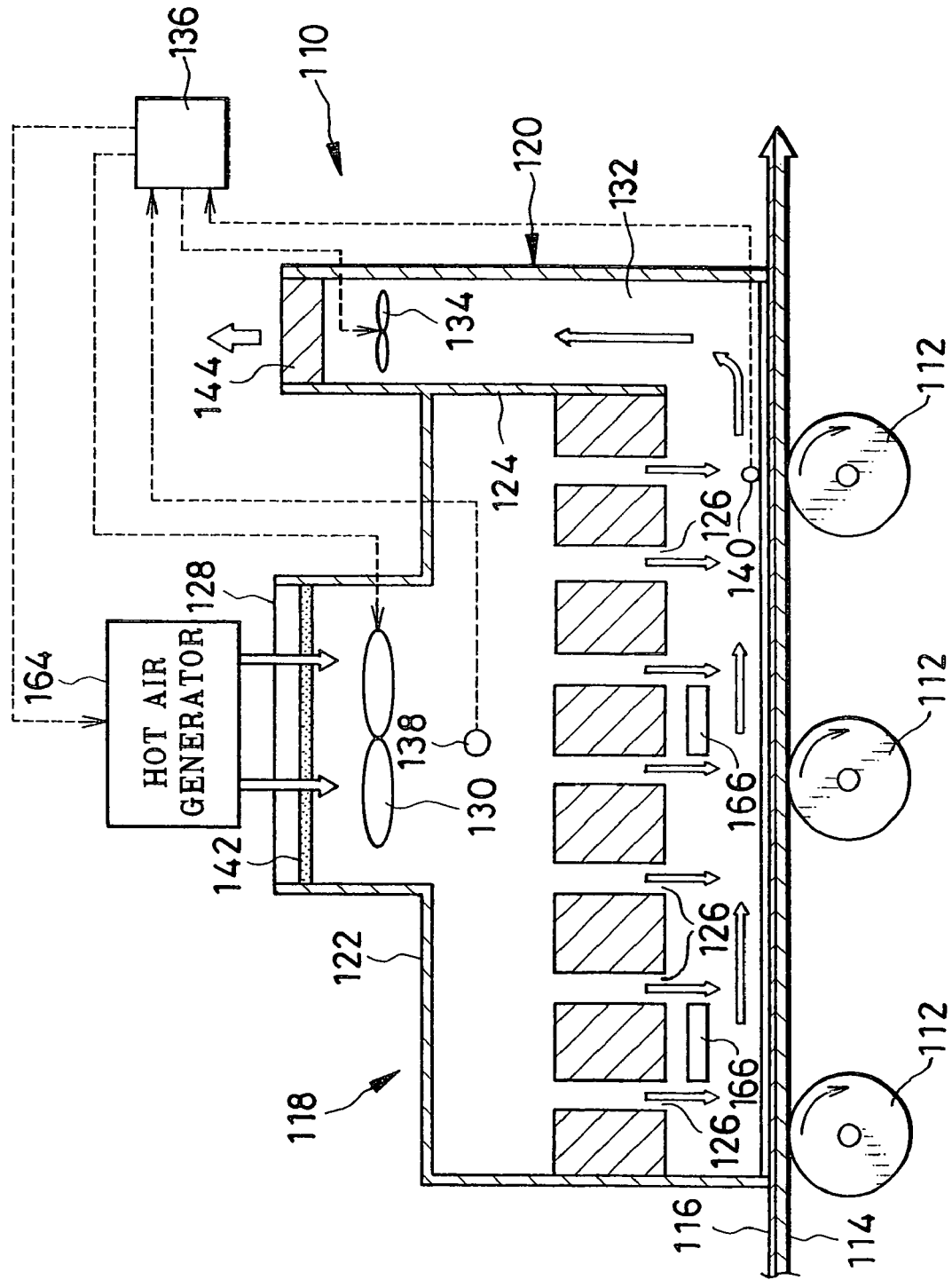
FIG. 10 is an explanatory view in section, illustrating a thermal treating apparatus of the invention.
Figure 11:
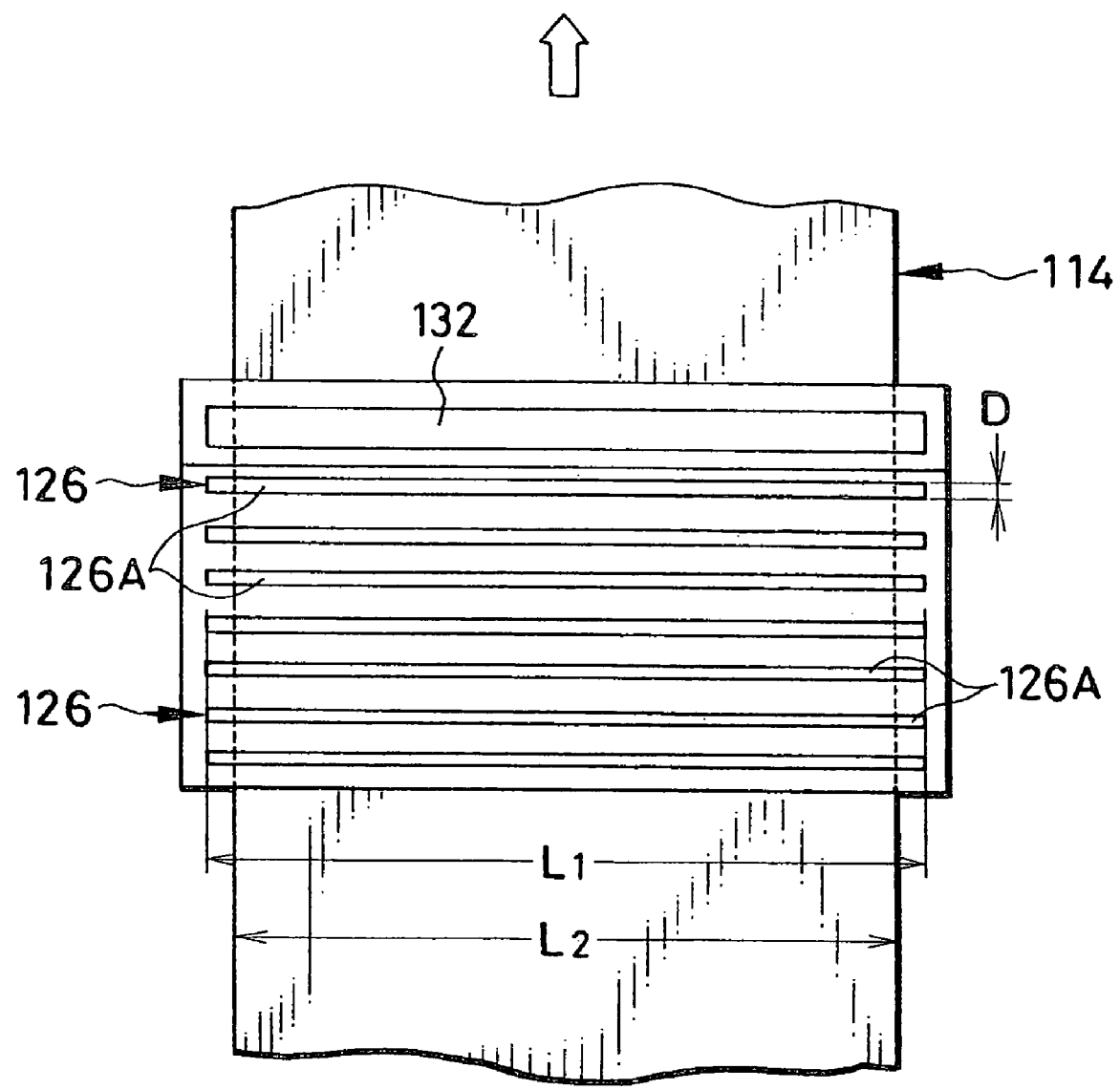
FIG. 11 is an explanatory view in plan, illustrating a hot air supply unit together with resin film.

In FIG. 10, the thermal treatment is depicted. In FIG. 11, a station for blowing with air and a station for exhaust of air are depicted.

In FIGS. 10 and 11, a thermal treating apparatus 110 is constituted by pass rollers 112, a hot air supply unit 118 and an exhaust unit 120. The pass rollers 112 guide traveling of resin film 114 as web. The resin film 114 includes a liquid crystal layer 116 as a coating. The hot air supply unit 118 blows the liquid crystal layer 116 with hot air. The exhaust unit 120 sucks and ejects the hot air from the liquid crystal layer 116. A casing 122 in a quadrilateral shape constitutes a body of the thermal treating apparatus 110, and has upper and lower openings. A partition plate 124 separates the exhaust unit 120 from the hot air supply unit 118 in a direction crosswise to travel of the resin film 114.

A plurality of air blow openings 126 are formed in a lower wall of the hot air supply unit 118 facing the liquid crystal layer 116. A hot air generator 164 is connected to a supply duct 128, where a fan 130 or blower is disposed. The fan 130 is changeable in rotational speed. An exhaust opening 132 is formed in a lower side of the exhaust unit 120. A fan 134 or blower is disposed over the exhaust opening 132 in the exhaust unit 120, and changeable in rotational speed. A controller 136 is connected with the fans 130 and 134 and the hot air generator 164, and controls those elements in the thermal treating apparatus 110. When the fans 130 and 134 rotate, hot air flowing from the hot air generator 164 to the hot air supply unit 118 is caused to blow the liquid crystal layer 116 of the resin film 114 through the air blow openings 126 while the resin film 114 travels. The hot air is sent into the exhaust unit 120 through the exhaust opening 132 and ejected from the apparatus. The hot air flows as a form of an air flow in a direction of traveling of the resin film 114 because the hot air flows from the air blow openings 126 toward the exhaust opening 132 and is influenced by traveling of the resin film 114. It is preferable that a component flow speed of the hot air as viewed in a direction perpendicular to traveling of the resin film 114 is 1 m/sec or less, preferably 0.8 m/sec, and most preferably 0.7 m/sec or less.

Figure 12:
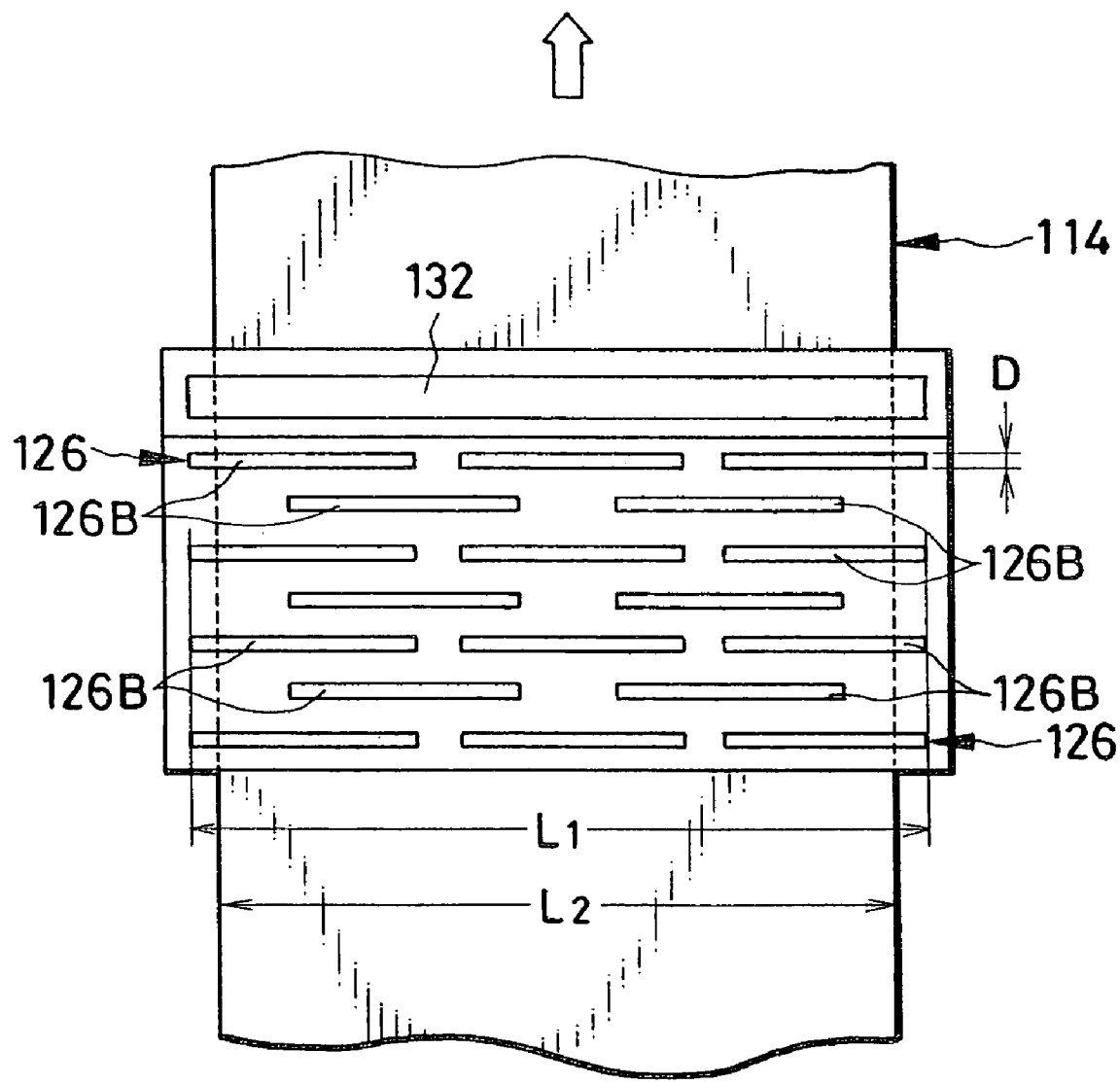
FIG. 12 is an explanatory view in plan, illustrating one preferred hot air supply unit having nozzles arranged in a zigzag.
Figure 13:
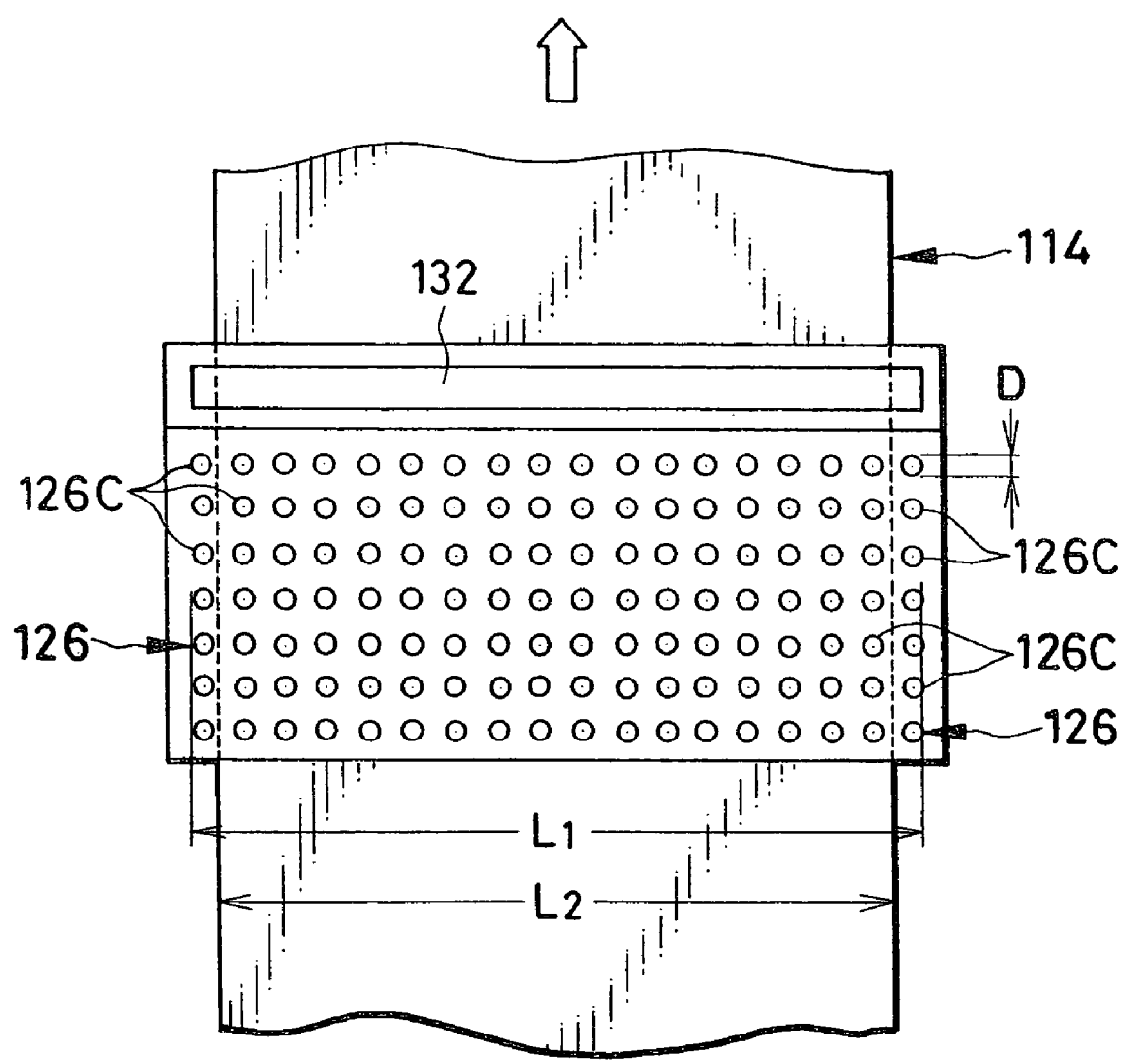
FIG. 13 is an explanatory view in plan, illustrating another preferred hot air supply unit having hole-shaped nozzles.

The air blow openings 126 are constituted by slit-shaped nozzles, a slit-formed plate, a plate of punched metal, and the like. In FIG. 11, slit-shaped nozzles 126A extend crosswise to traveling of the resin film 114, and are arranged along the traveling of the resin film 114. In FIG. 12, the air blow openings 126 are slit-shaped nozzles 126B formed in a plate of punched metal. In FIG. 13, nozzles 126C are circular holes.

A size L1 of the air blow openings 126 as viewed crosswise to traveling of the resin film 114 is longer than a web width L2 of the resin film 114, is 1.05-2 times as long as the web width L2, and preferably 1.1-1.5 times as long. It is preferable that a size of the exhaust opening 132 as viewed crosswise to the feeding should be equal to the size L1 of the air blow openings 126. In the construction with the slit-shaped nozzles 126B or the nozzles 126C formed in the air blow openings 126, the size of each of the slit-shaped nozzles 126B or the nozzles 126C is shorter than web width L2 of the resin film 114. However, the size L1 of a region of a combination of the slit-shaped nozzles 126B or the nozzles 126C as viewed crosswise to traveling of the resin film 114 should be longer than a web width L2. See FIGS. 12 and 13. Also, it is necessary to suppress differences with reference to the direction crosswise to traveling of the resin film 114 in heat quantity applied to the resin film 114 by arrangement of the slit-shaped nozzles 126B or the nozzles 126C in a chain manner. A size D of the air blow openings 126 as viewed in a traveling direction of the resin film 114 is 1-100 mm, and preferably 3-10 mm.

Preferably, a distance from the air blow openings 126 to the liquid crystal layer 116 of the resin film 114 is 3-300 mm.

A flow speed of hot air through the air blow openings 126 can be determined suitably in consideration of characteristics of the liquid crystal layer 116 and in combination with temperature. In the present embodiment, the flow speed is 0.5-50 m/sec, and preferably 1-20 m/sec because of great ease in creating of an air flow in the feeding direction of the resin film 114. The temperature of the hot air is preferably 70-300° C. Furthermore, a far infrared heater 166 may be additionally provided in the dust removing device 10 for a combined use with the hot air to heat the liquid crystal layer 116.

A temperature sensor 138 is disposed in the casing 122 of the hot air supply unit 118, and monitors temperature of hot air blowing the liquid crystal layer 116 through the air blow openings 126. A three-dimensional flow speed sensor 140 is disposed very near to the liquid crystal layer 116, and monitors flow speed of the hot air from the air blow openings 126. Signals of detection of the temperature sensor 138 and the flow speed sensor 140 are sent to the controller 136. According to the detection signals, the controller 136 controls a rotational speeds of the fans 130 and 134, and temperature of heating air in the hot air generator 164 in a manner of feedback control so as to optimize a flow speed of blow of the hot air, a flow speed of the hot air in a direction crosswise of the resin film 114, and the hot air temperature for the above-described conditions.

If desired, a filter 142 can be disposed in the hot air supply unit 118 with the fan 130 to eliminate dust from hot air. A low molecular weight polymer remover 144 may be positioned downstream from the fan 134 of the exhaust unit 120, utilize oxidizing catalyst, and eliminate low molecular weight polymer volatilizing from the liquid crystal layer 116. Furthermore, a moisture adjustor (not shown) may be used to adjust to moisture component included in the hot air.

In the present embodiment, hot air is used as gas or heating medium in thermal treatment. However, other kinds of gas may be used. Examples of gases are nitrogen, noble gas (argon and the like), carbon dioxide, and the like, and a mixture of some of those, and a mixture of air with some of those.

Examples of the resin film 114 are polyethylene terephthalate (PET), polyethylene naphthalate (PEN) and the like. Alternatively, web to be treated thermally may be paper, metal foil, and other continuous material. For the purpose of producing an optical compensatory sheet, the resin film 114 can preferably be cellulose acetate film. The resin film 114 can have a preferable width of 300-5,000 mm, and a preferable thickness of 3-1,000 μm.

Operation of the thermal treating apparatus 110 for thermal treatment of the liquid crystal layer 116 is hereinafter described.

In the thermal treating apparatus 110, the fans 130 and 134 are actuated for hot air to flow out of the air blow openings 126 and blow the liquid crystal layer 116 of the resin film 114 being traveled. The hot air is sucked through the exhaust opening 132 positioned downstream from the air blow openings 126. The hot air flows in an air flow from the air blow openings 126 toward the exhaust opening 132, and follows traveling of the resin film 114. The air flow occurs reliably in a direction equal to the traveling direction of the resin film 114.

It has been found that, when the liquid crystal layer 116 on the resin film 114 being traveled is blown with hot air, a flow of air in the traveling direction does not cause unevenness in heating, but that a flow of air crosswise to the traveling is very likely to cause unevenness in heating in a seriously influencing manner to the finished condition of the liquid crystal layer 116. It is concluded that the liquid crystal layer 116 can be heated effectively with hot air flowing at a high speed in the traveling direction and at a low speed in the crosswise direction.

In the thermal treatment, a component flow speed of the hot air as viewed in a direction perpendicular to traveling of the resin film 114 is 1 m/sec or less, preferably 0.8 m/sec or less, and most preferably 0.7 m/sec or less. If it is desired in general to reduce the component flow speed of the hot air, the flow speed of blow through the air blow openings 126 can be reduced. However, this causes a problem of insufficiency in heating the liquid crystal layer 116. If the flow speed of exhaust is excessively smaller than the flow speed of blow, then a flow in a direction along traveling of the resin film 114 may not occur stably. The component flow speed of the hot air as viewed in a direction perpendicular to traveling of the resin film 114 is likely to become too high. Therefore, a rotational speed of the fan 130 should be maintained to obtain a flow speed of blow through the air blow openings 126 suitably for heating the liquid crystal layer 116. Also, the rotational speeds of the fans 130 and 134 should be so determined as to keep the component flow speed of the hot air as viewed crosswise to traveling of the resin film 114 equal to or less than 1 m/sec.

It follows that the liquid crystal layer 116 of the resin film 114 can be heated by hot air with heat quantity regularized in a direction crosswise to traveling of the resin film 114. Distribution of heat in the thermal treatment is kept even two-dimensionally.

In the present invention, the size L1 of the air blow openings 126 as viewed crosswise to traveling of the resin film 114 is 1.05-2 times as long as the web width L2. Thus, the flow speed of the hot air in the film traveling direction can be regularized with reference to a direction crosswise to the traveling direction. Specifically, the hot air is likely to flow slower in positions near to lateral walls of the casing 122. Should the size L1 of the air blow openings 126 crosswise to the traveling direction be smaller than 1.05 times of the web width L2, then efficiency in thermal treatment becomes extremely lower in the position near to the lateral walls than central positions. In contrast, should the size L1 of the air blow openings 126 crosswise to the traveling direction be greater than two times of the web width L2, then there occur flows in positions near to the lateral walls beside the resin film 114 and from a film upper surface to a film lower surface without blowing the resin film 114. This is undesirable, because considerable flows are likely to occur beside the resin film 114 in directions crosswise to traveling of the resin film 114.

The size L1 of the air blow openings 126 is 1.05-2 times as long as the web width L2. Local unevenness in the thermal treatment can be suppressed specially at the end positions of the air blow openings 126.

Figure 18:
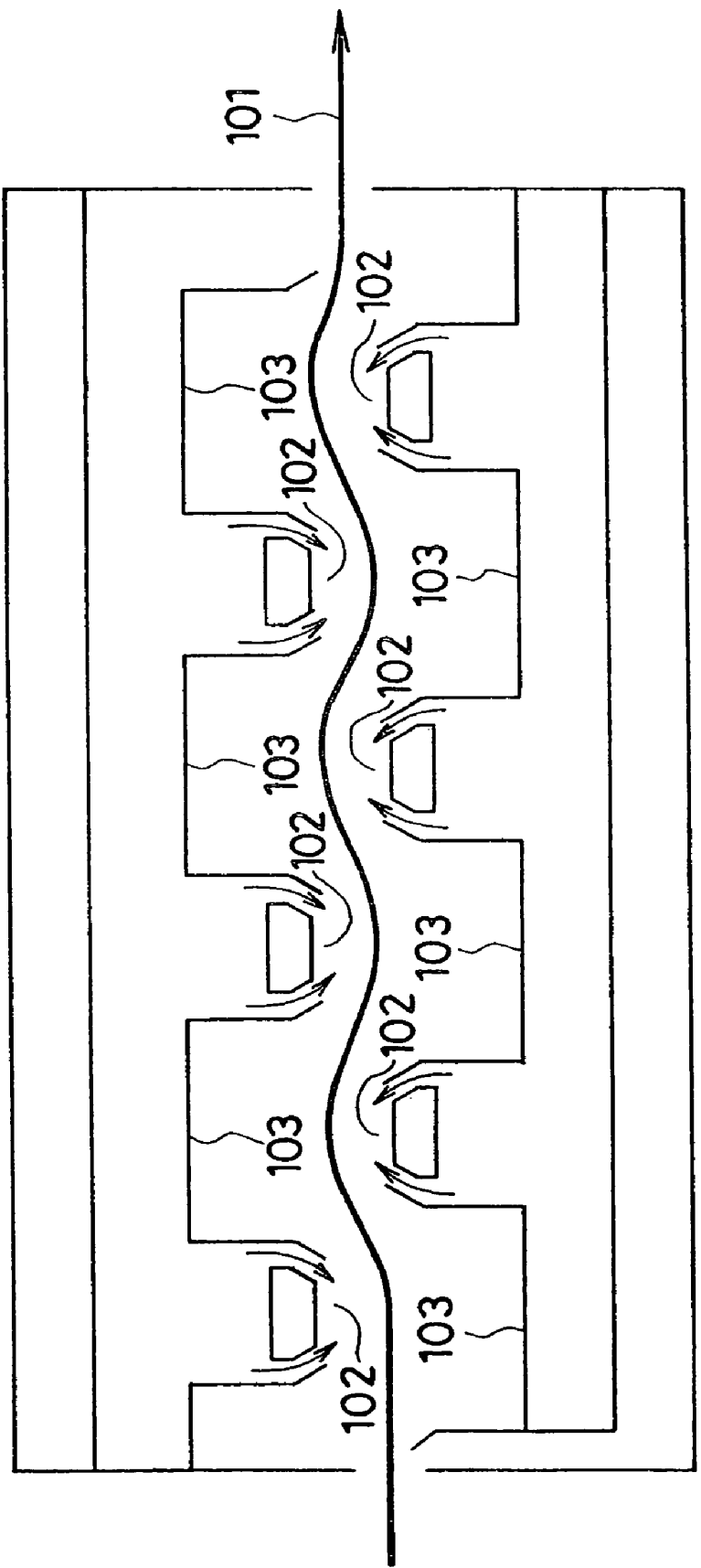
FIG. 18 is an explanatory view illustrating a thermal treating apparatus according to the prior art.

The prior art is illustrated in FIG. 18. Hot air is supplied through air blow openings 102 on the side of the liquid crystal layer 116, and sucked through exhaust openings 103 on the side opposite to the air blow openings 102. Portions of the liquid crystal layer 116 at ends in the web width direction are provided with the highest flow speed among plural portions of the liquid crystal layer 116. Also, considerable flows are likely to occur beside resin film 101 in directions crosswise to traveling of the resin film 101. Therefore, it is impossible in the prior art to accomplish the object of the invention. Unevenness in thermal treatment occurs in the liquid crystal layer 116. Furthermore, another prior type of thermal treatment has a problem. In this type, the exhaust openings are positioned opposite to the air blow openings with reference to the web width direction. The flow speed becomes the highest in a position of the liquid crystal layer the nearest to the exhaust openings. Unevenness in thermal treatment occurs in an unwanted manner.

In the present embodiment, the exhaust unit 120 is positioned downstream from the hot air supply unit 118. In contrast, it is possible to position the exhaust unit 120 upstream from the hot air supply unit 118, to create a flow of hot air that is countercurrent to traveling of the resin film 114. Furthermore, it is possible that there are two exhaust units 120 between which the hot air supply unit 118 is disposed. Alternatively, the thermal treating apparatus 110 can have the plural air blow openings 126 and plural exhaust openings 132 alternate with the air blow openings 126. In any of those constructions, the hot air supply unit 118 and the exhaust unit 120 are arranged in the traveling direction to create the flow of hot air along traveling of the resin film 114. The air flow in the traveling direction should have a speed sufficiently high for thermally treating the liquid crystal layer 116. The air flow in the crosswise direction should have as low a speed as possible.

In the present embodiment, the thermal treating apparatus 110 is single. However, a plurality of thermal treating apparatuses 110 may be arranged in the traveling direction of the resin film 114. Also, temperature and flow speed of blow of air may be determined individually in the plural thermal treating apparatuses 110. It is possible to effect the control of the present invention in all the plural thermal treating apparatuses 110, or in part of the plural thermal treating apparatuses 110.

Specifically, it is preferable to effect the control of the present invention in a downstream part of the plural thermal treating apparatuses 110.

The thermal treatment according to the invention may be used for photosensitive material, thermosensitive material, pressure-sensitive recording material, magnetic recording tape, and other types of recording materials. In particular, the thermal treatment herein can be used effectively in a process of liquid crystal layer forming in manufacturing an optical compensatory sheet.

An example of the thermal treating apparatus 110 for use in producing an optical compensatory sheet is described next.

EXAMPLES

In FIG. 14, a sheet producing line including the thermal treating apparatus 110 is illustrated. A web supply device 150 supplies the resin film 114. Plural guide rollers 152 guide the resin film 114 while the resin film 114 is traveled past a rubbing unit 154, a liquid crystal layer coater 156, a preliminary drier 158, a main drier 160, the thermal treating apparatus 110 of the invention, and an ultraviolet ray emitter 162 as curing unit. Then a winder 168 winds the resin film 114 finally. There is a rubbing roller 154A in the rubbing unit 154 for rubbing operation of the resin film 114.

Sample 3

According to the invention, the resin film 114 was triacetyl cellulose film Fujitac (trade name, manufactured by Fuji Photo film Co., Ltd.), and was 1,000 mm wide and 100 μm thick. Then a surface of the resin film 114 was coated with solution at an amount of 25 ml per 1 m$^2$, the solution including 2 wt. % of long-chain alkyl modified polyvinyl alcohol MP-203 (trade name) manufactured by Kuraray Co., Ltd. After the coating operation, the resin film 114 was dried for 1 minute at 60° C. to form a preliminary resin layer, and was traveled at 18 m/min. During the travel, a surface of the preliminary resin layer was subjected to rubbing treatment to obtain an orientation layer. Pressure of the rubbing roller 154A was 98 Pa per 1 cm$^2$ of the preliminary resin layer (1 kgf/cm$^2$). A rotational speed of the periphery of the rubbing roller 154A was 5.0 m/sec. The orientation layer, which was obtained by rubbing of the preliminary resin layer, was coated with liquid crystal coating solution while the resin film 114 was traveled at a traveling speed of 18 m/min. For the liquid crystal coating solution, discotic compounds 2,3,6,7,10,11-hexa(4-n-octyloxybenzoyloxy)triphenylene and 2,3,6,7,10,11-hexa(3-n-pentyloxybenzoyloxy)triphenylene were mixed at a weight ratio of 4:1. Photo polymerization initiator Irgacure 907 (trade name) manufactured by Japan Ciba-Geigy was added to the mixture of the compounds at 1 wt. %. Then the mixture was dissolved in methyl ethyl ketone at 40 wt. %, to obtain the liquid crystal coating solution. In the coating operation, a wire bar was used to control the coating amount at 5 ml per 1 m$^2$ of the resin film 114. Then the resin film 114 was dried at 100° C., and subjected to thermal treatment by the thermal treating apparatus of the invention, to form a discotic nematic phase.

The thermal treating apparatus 110 had the slit-shaped nozzles 126A of which the size L1 is 1,200 mm. The thermal treating apparatus 110 supplied hot air to the resin film 114 at a flow speed of 5 m/sec for blow, at temperature of 130° C. for three (3) minutes. A speed of the air crosswise to the traveling of the resin film 114 was measured to be 0.5 m/sec. To obtain this, a zone 50 mm long in the resin film 114 was measured at 11 points every 100 mm in the crosswise direction. The maximum of the speeds obtained from 11 points was determined as the measured speed of the air in the crosswise direction. The three-dimensional flow speed sensor 140 for the measurement was constituted by a three-dimensional ultrasonic gas flow meter WA-390 manufactured by Kaijo Corporation. After the thermal treatment, the liquid crystal layer 116 received ultraviolet rays from the ultraviolet ray emitter 162, and cured by cross linking, before the resin film 114 becomes wound by the winder 168.

The resin film 114 was unwound from the winder 168, and cut into 10 sample pieces of optical compensatory sheets.

Sample 4

Sample 4 was the same as Sample 3 except for the flow of hot air in the thermal treating apparatus 110, where a flow speed in the direction crosswise to the traveling was set 1.0 m/sec. 10 sample pieces of optical compensatory sheets were cut from the resin film 114 in a manner similar to Sample 3.

Comparative Example 4

Prior Art

For Comparative Example 4, a thermal treating apparatus of the prior art was used, and provided with an air blow opening and an exhaust opening. The air blow opening is disposed in a position associated with one lateral edge of the resin film 114. The exhaust opening is so disposed that a center line of the resin film 114 lies between the air blow opening and the exhaust opening. A flow speed in the direction crosswise to the traveling was set 2.0 m/sec. Other conditions of the thermal treating apparatus were the same as those of Sample 3. 10 sample pieces of optical compensatory sheets were cut from the resin film 114 in a manner similar to Sample 3.

Comparative Example 5

Prior Art

Comparative Example 5 was the same as Comparative Example 4 except for the flow of hot air in the thermal treating apparatus, where a flow speed in the direction crosswise to the traveling was set 4 m/sec. 10 sample pieces of optical compensatory sheets were cut from the resin film 114 in a manner similar to Sample 3.

Results of experiments from Samples 3 and 4 and Comparative Examples 4 and 5 were evaluated in view of the flow speed of the air in the direction crosswise to traveling, an angular difference of an orienting angle from the intended orientation axis, and quality of the product as an optical compensatory sheet. See the table below. Note that the angular difference from orientation axis in the table is an average of 10 samples for each example. To estimate the quality, three grades of good, passing and failure were used.

|  | Flow Speed of Air in Crosswise Direction (m/sec) | Angular Difference (°) From Orientation Axis | Quality |
| --- | --- | --- | --- |
| Sample 3 | 0.5 | 0.4 | Good |
| Sample 4 | 1.0 | 1.0 | Passing |
| Comparative Example 4 | 2.0 | 2.3 | Failure |
| Comparative Example 5 | 4.0 | 3.8 | Failure |

It is concluded from the table that Samples 3 and 4 obtained according to the thermal treating apparatus 110 of the invention had a very small angular difference of the orientation from the orientation axis, and had high quality as a product of the optical compensatory sheet. In particular, Sample 3, obtained after setting the flow speed in the crosswise direction as 0.5 m/sec, had an extremely small angular difference of the orientation from the orientation axis. The entire surface of the liquid crystal layer 116 can be used as a product, to increase yield in producing the optical compensatory sheet.

In contrast, poor results were obtained from Comparative Examples 4 and 5 where the flow speed in the crosswise direction was higher than 1 m/sec in a manner different from the invention. There occurred a considerably great angular difference of the orientation from the orientation axis. Quality was low as a product of the optical compensatory sheet.

In view of those results, the thermal treating apparatus 110 of the invention is effective in minimizing the angular difference of the orientation from the orientation axis for use in producing the liquid crystal layer. The yield of the product can be high. Furthermore, the quality of the product can be checked reliably even in reducing the number of products sampled from the manufacturing line for the purpose of inspecting the orientation axis after the thermal treatment. The productivity of the optical compensatory sheet can be high. Also, manual operation of operators in the factory can be considerably quick and easy in view of the same check of products as before. This is effective in reducing the cost of the optical compensatory sheet.

Still another preferred embodiment is hereinafter described, in which a dust removing apparatus is capable of operation without damaging a surface of web.

Figure 15A:
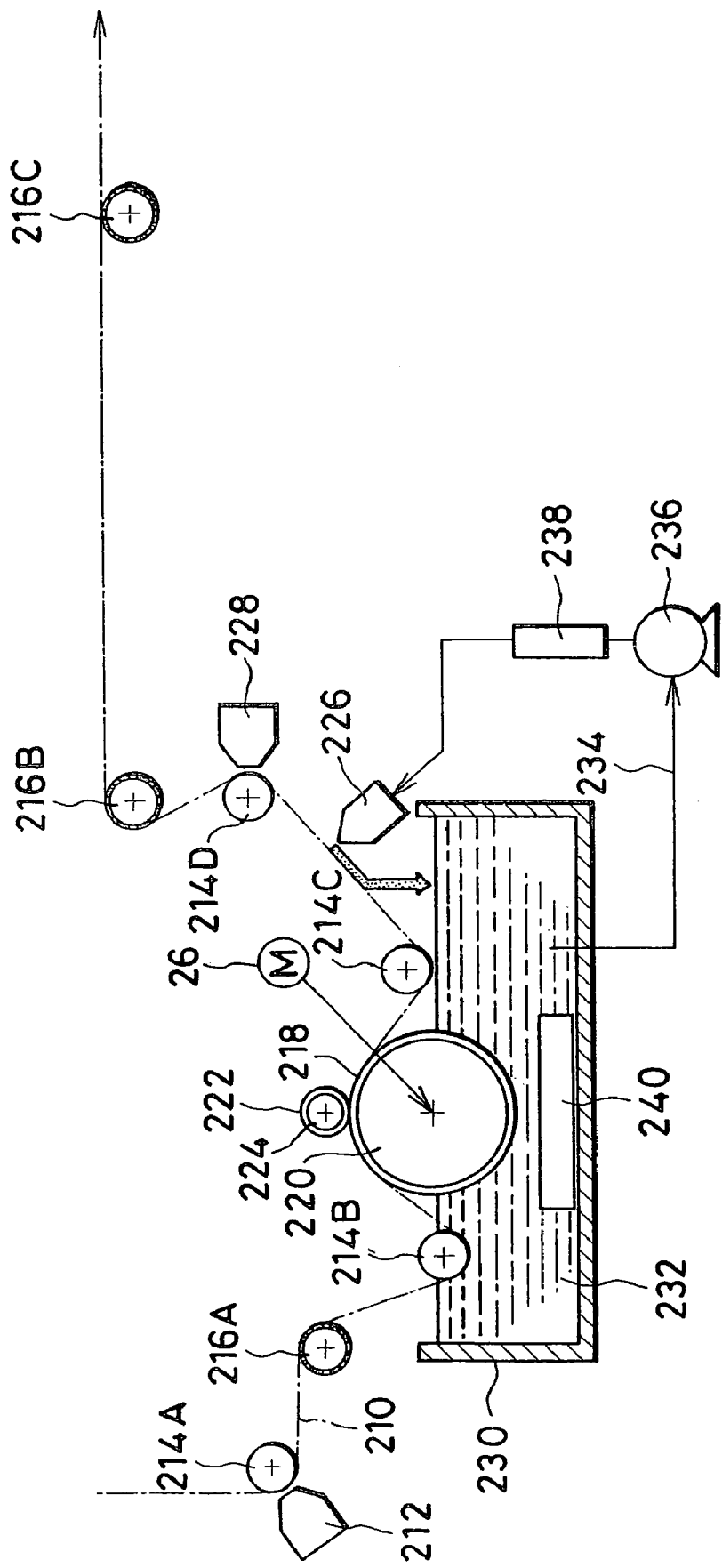
FIG. 15A is an explanatory view illustrating a dust removing apparatus of the invention.

In FIG. 15A, the dust removing apparatus is constituted by guide rollers 214A, 214B, 214C and 214D, hovering rollers 216A, 216B and 216C as feeders, a first dust removing device 212, a cleaning roller 220, a pinch roller 224, a rinsing unit 226 and a drier 228. Resin film 210 as web travels while guided by the guide rollers 214A, 214B, 214C and 214D and the hovering rollers 216A, 216B and 216C. The first dust removing device 212 supplies compressed air to, and sucks the same from, the surface of the resin film 210, and removes dust in a dry manner. The cleaning roller 220 includes a resilient roll 218, which frictionally contacts the resin film 210 to eliminate dust from the resin film 210. The pinch roller 224 includes a resilient roll 222, which contacts a back surface of the resin film 210 and presses the resin film 210 against the resilient roll 218 for efficient elimination of dust. The rinsing unit 226 rinses and cleans the surface after being polished by the cleaning roller 220. The drier 228 supplies and sucks compressed air, and dries the resin film 210 by blowing remainder of rinsing liquid on the resin film 210. Note that the cleaning roller 220 and the pinch roller 224 constitute a second dust removing device.

The guide rollers 214A-214D and the hovering rollers 216A-216C are suitably positioned to guide traveling of the resin film 210. The guide rollers 214A-214D contact a back surface of the resin film 210. The hovering rollers 216A-216C are opposed to a front surface of the resin film 210 reverse to the back surface.

Figure 15B:
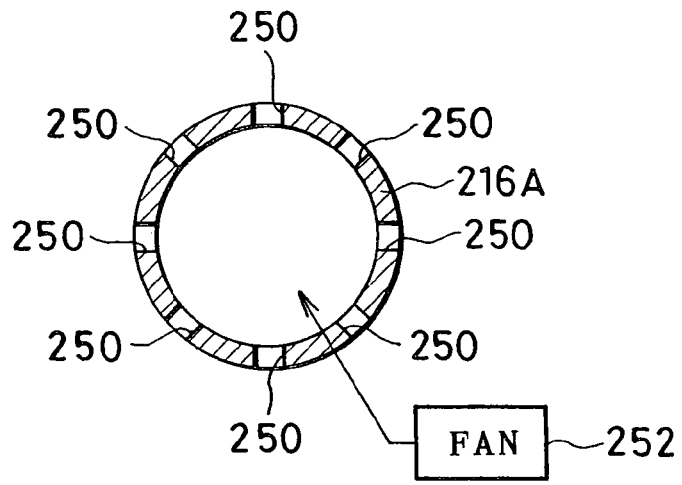
FIG. 15B is a cross section illustrating a hovering roller in the dust removing apparatus together with a fan.

In FIG. 15B, the hovering roller 216A is depicted. The hovering rollers 216A-216C guide the resin film 210 in a manner without contact its surface. To this end, holes 250 or slits are formed in a peripheral wall of the hovering rollers 216A-216C. A fan 252 or blower is connected with a duct disposed at a pivot of the hovering rollers 216A-216C to communicate the inside of the rollers. Compressed air is supplied by the fan 252 to the inside of the hovering rollers 216A-216C, and ejected through the holes 250 to hover the resin film 210 while the resin film 210 travels. Thus, deposition of dust to the resin film 210 is prevented effectively after the dust removal.

The positions of the guide rollers 214A-214D and the hovering rollers 216A-216C are conditioned as follows. The resin film 210 is caused to contact the resilient roll 218 about the cleaning roller 220 with a positive angle of lap after dust removal in the first dust removing device 212. Also, the front surface of the resin film 210 after moving past the cleaning roller 220 is guided in a path close to the rinsing unit 226 and the drier 228 that are positioned downstream.

A diameter of the hovering rollers 216A-216C is 3-30 cm, preferably 10-25 cm in consideration of flexure and weight. Pressure of compressed air in the hovering rollers 216A-216C is 490-6,865 Pa (50-700 mmAq), and preferably 1,961-4,903 Pa (200-500 mmAq), which is for the purpose of hovering the resin film 210 at a distance of 0.1-10 mm, preferably 0.5-5 mm in a manner overcoming film tension. A flow speed of the compressed air is 1-50 m$^3$ per minute, and preferably 3-30 m$^3$ per minute.

Figure 15C:
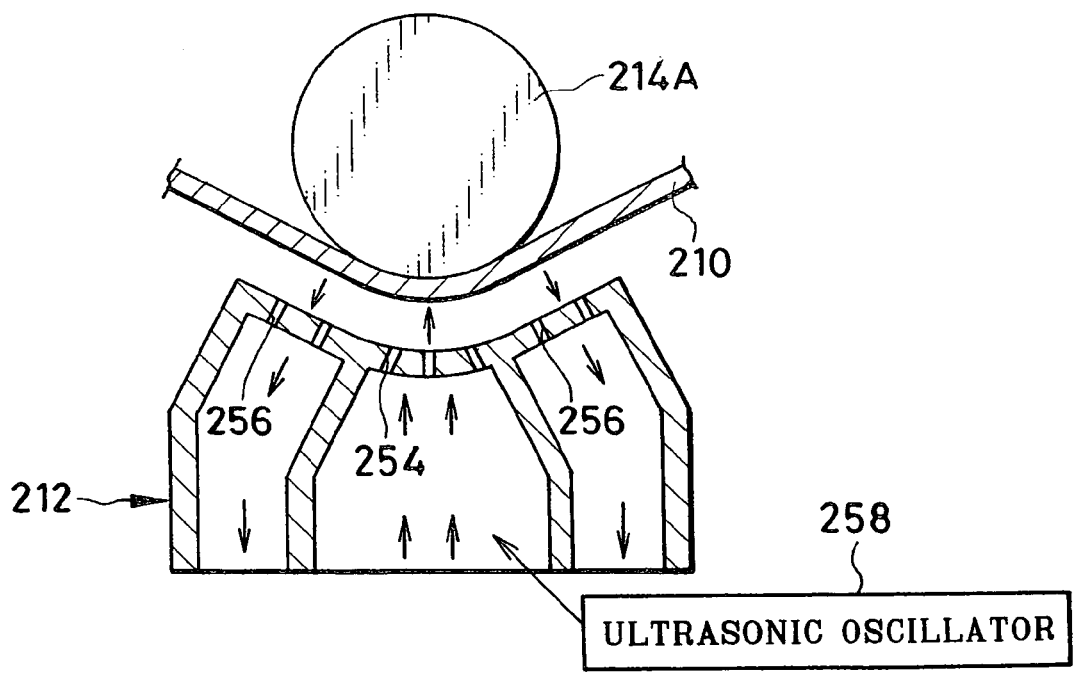
FIG. 15C is a cross section illustrating a first dust remover unit of a dry type.

The first dust removing device 212 blows the resin film 210 with compressed air with high cleanness, and eliminates foreign matter from the surface of the resin film 210. The first dust removing device 212 is disposed close to the resin film 210, opposed to the guide roller 214A, and provided with a high-pressure air supply/exhaust machine (not shown) connected therewith. In FIG. 15C, plural air blow openings 254 and plural exhaust openings 256 are formed in the first dust removing device 212, are slit-shaped, and extend crosswise to the traveling direction of the resin film 210. The air blow openings 254 blow the resin film 210 with the compressed air. The exhaust openings 256 suck and eject the compressed air and also dust removed from the resin film 210.

Furthermore, an ultrasonic oscillator 258 may be disposed inside the air blow openings 254 for applying ultrasonic waves to the compressed air to blow the resin film 210. The first dust removing device 212 can be constituted by an ultrasonic dust remover which supplies vibrated compressed air, and sucks dust. An example of the ultrasonic dust remover is New Ultra Cleaner (trade name) manufactured by Shinko Co., Ltd. This is highly effective in dust removal, because of a separating operation to subjecting dust to shearing in boundary layers of air flow that have a thickness from tens of μm to 100 μm, and because of vibrating operation with ultrasonic waves.

A distance from the first dust removing device 212 to the resin film 210 is 0.1-10 mm, and preferably 0.3-5 mm so as to obtain effects in dust removal without blocking handling of the resin film 210. Flow speeds of supply and exhaust of the compressed air can be set high with advantages in a range not to influence ease in handling. It is particularly important in dust removal to balance the flow speeds between the supply and exhaust of the air with cleanness. The exhaust flow speed is determined higher than the supply flow speed. The supply and exhaust flow speeds are determined 1-100 m$^3$/min, and preferably 10-40 m/min. The exhaust flow speed is determined higher than the supply flow speed by a difference of 0.1-50 m$^3$/min, and preferably 1-10 m$^3$/min. A pressure of supply of compressed air is set 5-100 kPa, preferably 10-50 kPa, and most preferably 20-35 kPa. A pressure of exhaust of compressed air is set 1-20 kPa, and preferably 3-10 kPa.

The cleaning roller 220 polishes the resin film 210 continuously by means of the resilient roll 218, to remove dust from the resin film 210. The cleaning roller 220 is constituted by a roller body and the resilient roll 218 disposed about the roller body. The cleaning roller 220 is disposed between the guide rollers 214B and 214C. A cleaning liquid bath 230 stores cleaning liquid 232, in which a lower half of the cleaning roller 220 is dipped. The motor 26 of FIG. 4 is associated with the cleaning roller 220, and rotates the same. The resin film 210 is polished by the resilient roll 218 which rotates with friction.

As the lower half of the cleaning roller 220 is dipped in the cleaning liquid 232, rotation of the cleaning roller 220 makes the resilient roll 218 incessantly wet with the cleaning liquid 232. Thus, the dust can be removed with at least 1,000 times as high force of shearing as a dry type of dust remover. It is possible reliably to remove small dust stuck firmly. In the present embodiment, at first the dry type of dust removal is effected for removing weakly stuck dust. Then the wet type of dust removal is effected for removing strongly stuck dust. In the end, high effects in removal of dust are obtained.

In the present embodiment, only a lower half of the cleaning roller 220 is dipped in the cleaning liquid 232. However, the entirety of the cleaning roller 220 may be dipped in the cleaning liquid 232.

The pinch roller 224 is supported in a rotatable manner. The resilient roll 222 about the pinch roller 224 is pressed against a back surface of the resin film 210. So a front surface of the resin film 210 is pressed against the resilient roll 218 about the cleaning roller 220 to keep high the pressure locally along one line. Effects in polishing the resin film 210 with the resilient roll 218 are increased. The pinch roller 224 is constituted by a roller body and the resilient roll 222 disposed about the roller body, and so disposed that the resin film 210 lies between it and the cleaning roller 220.

In the pinch roller 224, the resilient roll 222 has a thickness equal to or more than 0.5 mm, preferably 0.5-100 mm, and desirably 1.0-50 mm. Any suitable material may be used to produce the resilient roll 222. Examples of the material for the resilient roll 222 are polyamides (such as 6-nylon, 66-nylon, and copolymer nylon), polyesters (such as polyethylene terephthalate, polybutylene terephthalate, and copolymer polyester), polyolefins (such as polyethylene and polypropylene), polyvinyl halide (such as polyvinyl chloride, poly vinylidene fluoride, and Teflon), natural rubber, neoprene rubber, nitrile rubber, Nordel, Viton rubber, Hypalon, polyurethane, rayon, cellulose, and the like. The resilient roll 222 formed from those resilient materials may have a structure formed from a single material, mixed structure, layered structure, a structure of woven fabric with fibers, and a non-woven structure as a non-woven fabric. Conditions of preferable materials include a characteristic not being softened or dissolved by the cleaning liquid 232, and also a lower hardness than that of the surface of the resin film 210.

Note that, if the resilient roll 222 has too great a size in a direction crosswise to the film traveling, there occurs a problem in handling due to a difference in the speed between the resilient roll 218 and the resin film 210 with both of which the resilient roll 222 is in contact. If the resilient roll 222 has too small a size in the crosswise direction, there occurs a problem in effects in dust removal because lateral edge portions of the resin film 210 are not pressed by the resilient roll 222. It is concluded that the size of the resilient roll 222 in the crosswise direction is preferably equal to or more than a size of a product to be taken from the resin film 210, and equal to or less than a sum of the size of the resin film 210 and a range of a zigzag shift during the travel.

A position of the pinch roller 224 may be determined in any suitable manner in combination with the cleaning roller 220 to nip the resin film 210, but is restricted by a space and relative position for determining the angle of lap of the resin film 210 to the cleaning roller 220.

A diameter of the pinch roller 224 is less than 200 cm, preferably 1-100 cm, and desirably 1-20 cm in consideration of a space to be occupied, precision in manufacture, and a manufacturing cost.

The pressure of the pinch roller 224 to press the resin film 210 against the cleaning roller 220 is determined equal to or less than 981 N per meter of the width, preferably 0.3-490 N/m, and desirably 1-245 N/m (equal to or less than 100 kgf per meter of the width, preferably 0.03-50 kgf/m, and desirably 0.1-25 kgf/m).

The rinsing unit 226 rinses and cleans the resin film 210 by jetting or spraying the cleaning liquid 232 to the front surface of the resin film 210 after being polished by the cleaning roller 220. The rinsing unit 226 is disposed between the guide rollers 214C and 214D.

The cleaning liquid to be sprayed by the rinsing unit 226 is obtained by clarifying the cleaning liquid 232 stored in the cleaning liquid bath 230. A pipe 234 connects the rinsing unit 226 to the cleaning liquid bath 230. A pressure feed pump 236 is associated with the pipe 234, and sends the cleaning liquid 232 from the cleaning liquid bath 230. A filtration equipment 238 clarifies the cleaning liquid 232, which is sent to the rinsing unit 226 and sprayed. The cleaning liquid 232 from the rinsing unit 226 rinses the surface of the resin film 210 having been polished by the resilient roll 218 of the cleaning roller 220. Dust or foreign matter, which remains even after polishing with the resilient roll 218 or has been deposited due to the cleaning liquid 232 in the cleaning liquid bath 230, is washed away. The cleaning liquid 232 jetted or sprayed by the rinsing unit 226 strikes the resin film 210 and drops by gravity into the cleaning liquid bath 230. Accordingly, the cleaning liquid 232 is circulated.

The cleaning liquid 232 from the rinsing unit 226 should be preferably a material with a characteristic not to dissolve or extract a substance included in the resin film 210 or an undercoat layer with which the resin film 210 is coated, and a characteristic of not permeating in any of those. If the undercoat layer is formed from water-soluble material such as gelatine, the cleaning liquid 232 can include non-aqueous solvent with low polarity. Examples of the solvent used with the present invention are disclosed in *Shimban Yozai Pocket Book* (*Solvent Pocket Book, New Edition*, Ohmsha, Ltd., 1994). Of course, any suitable solvent may be used. A boiling point of the solvent is preferably 30-120° C. in view of quick drying. Viscosity of the solvent or fluid is preferably 50 mPa·s or less. Only one type of the cleaning liquid 232 may be used. Also, plural types of the cleaning liquid 232 can be used in combination.

In FIG. 15A, there is an ultrasonic vibrator 240, which applies ultrasonic waves to the resilient roll 218.

The ultrasonic vibrator 240 and the resilient roll 218 are suitably disposed so that part of the cleaning liquid 232 is located between those for the purpose of efficiently transmitting ultrasonic waves to the surface of the resilient roll 218.

The drier 228 blows and dries remainder of the cleaning liquid 232 existing on the resin film 210 after rinsing. The drier 228 is disposed near to the resin film 210 backed up by the guide roller 214D, and is provided with a fan or blower (not shown) for supplying and sucking compressed air. In a manner similar to the first dust removing device 212, the drier 228 includes the air blow openings 254 and the exhaust openings 256 respectively extending crosswise to traveling of the resin film 210. The compressed air with high cleanness is supplied by the fan or blower, and is caused to flow through the air blow openings 254 to the resin film 210. So the remainder of the cleaning liquid 232 is blown away from the resin film 210. Then the remainder is sucked through the exhaust openings 256, and removed.

Note that an ultrasonic vibrator may be disposed in the drier 228 and directed to the fan or blower. The ultrasonic vibrator applies ultrasonic waves to the compressed air to be supplied through the air blow openings 254.

Note that a distance from the drier 228 to the resin film 210 is 0.1-10 mm, and preferably 0.3-5 mm so as to obtain effects in drying without blocking handling of the resin film 210. Flow speeds of supply and exhaust of the compressed air can be set high with advantages in a range not to influence ease in handling. It is particularly important in drying by blow to balance the flow speeds between the supply and exhaust of the air with cleanness. The exhaust flow speed is determined higher than the supply flow speed. This is to prevent scattering of the cleaning liquid 232 with dust inside the apparatus, and also for a final process of dust removal in which final remainder of dust on the resin film 210 is eliminated with the cleaning liquid 232. The supply and exhaust flow speeds are determined 1-100 m$^3$/min, and preferably 10-40 m$^3$/min. The exhaust flow speed is determined higher than the supply flow speed by a difference of 0.1-50 m$^3$/min, and preferably 1-10 m/min. A pressure of supply of compressed air is set 5-100 kPa, preferably 10-50 kPa, and most preferably 20-35 kPa. A pressure of exhaust of compressed air is set 1-20 kPa, and preferably 3-10 kPa. The retrieved remainder of the cleaning liquid 232 is processed by an air/liquid separator device (not shown), and will be used again.

The operation of the dust removing apparatus is described next.

Examples of the resin film 210 to be cleaned according to the invention are polyester, polyethylene terephthalate, polyethylene naphthalate, cellulose nitride, cellulose ester, polyvinyl acetal, polycarbonate, polyvinyl chloride, polymeric vinylidene chloride, polyimide, polyamide, and other resins, and paper, metal, and the like. A typical example with flexibility is paper partially acetylated, or which is coated with a coating of barium hydroxide (baryta) and/or α-olefin polymer, of which examples are polyethylene, polypropylene, ethylene butene copolymer, and other polyolefins with a carbon number of 2-10. It is possible to add agents to the material of the resin film 210 for various industrial uses. Examples of materials produced by using the resin film 210 are classified as photosensitive material, magnetic recording tape, photographic film and the like. To produce those, the resin film 210 is coated with photosensitive substance, magnetic substance, photochemically reacting substance and the like.

In the dust removing apparatus, the resin film 210 travels while guided by the guide rollers 214A-214D and the hovering rollers 216A-216C. The guide rollers 214A-214D contact the back surface of the resin film 210. The hovering rollers 216A-216C are opposed to the front surface of the resin film 210, and guide the resin film 210 in a manner without contacting the resin film 210 for the purpose of preventing depositing of dust to the front surface. In the travel, at first the first dust removing device 212 removes dust in a dry manner without contact. Thus, the dust with relatively weak adhesion is removed.

The resin film 210 subjected to dust removal by the first dust removing device 212 is then polished continuously by the resilient roll 218 of the cleaning roller 220 in rotation while pressed by the resilient roll 222 of the pinch roller 224. Remainder of foreign matter, if stuck still on the resin film 210 with a somewhat strong adhesion, can be eliminated by the cleaning roller 220.

As the cleaning roller 220 rotates, the resilient roll 218 is kept wet with the cleaning liquid 232. Thus, dust can be removed with at least 1,000 times as high force or stress of shearing as a dry type of dust remover with air. Even small dust stuck firmly can be removed. Also, hardness of the resilient roll 218 is much smaller than a metal rod or blade. Even upon pressure of the resilient roll 218 to the resin film 210, very few scratches or damages will occur.

The resilient roll 218 after polishing the resin film 210 receives ultrasonic waves from the ultrasonic vibrator 240 during rotation in the cleaning liquid 232. Even if removed dust is still stuck on the resilient roll 218, the dust can be eliminated from the resilient roll 218 ultrasonically in the cleaning liquid 232. So the resilient roll 218 can polish the resin film 210 while kept clean. It is possible to avoid scratching the resin film 210 with the remaining dust, and avoid damaging the resin film 210.

The resin film 210 polished by the resilient roll 218 is subjected to ejection of the cleaning liquid 232 from the rinsing unit 226. It is possible to eliminate dust remaining after the polishing and dust carried from the cleaning liquid 232 and deposited to the resin film 210. For the cleaning liquid 232 ejected from the rinsing unit 226, the cleaning liquid 232 stored in the cleaning liquid bath 230 is used. The cleaning liquid 232 is filtered by the filtration equipment 238 before being sent to the rinsing unit 226. Thus, no dust is brought from the rinsing unit 226 with the cleaning liquid 232 and deposits on the resin film 210.

After rinsing, the resin film 210 is subjected to drying by blow of compressed air in the drier 228 in a non-contact manner. Finally, remaining small part of the dust or foreign matter can be eliminated from the resin film 210 with the cleaning liquid 232.

This being so, the dust removing apparatus of the invention can remove dust or any foreign matter from the surface of the resin film 210 without scratches or damages.

Note that, in the present embodiment, each of the first dust removing device 212, the cleaning roller 220, the pinch roller 224, the rinsing unit 226 and the drier 228 is single. However, it is possible to use two or more first dust removing devices 212, two or more combinations of the cleaning roller 220 and the pinch roller 224, two or more rinsing units 226 and two or more driers 228. This is typically effective when the resin film 210 is considerably contaminated, or if drying operation by blow is not very quick with the single drier 228.

Specifically, two or more series of the devices from the first dust removing device 212 to the drier 228 may be arranged in parallel. Furthermore, sections or parts in each of those devices may be disposed in a plural number. Alternatively, two or more first dust removing devices 212 may be disposed upstream from the single series from the cleaning roller 220 to the drier 228. Additionally, two or more first dust removing devices 212 and two or more combinations of the cleaning roller 220 and the pinch roller 224 may be disposed upstream from the rinsing unit 226 and the drier 228 which are single. Also, devices from the first dust removing devices 212 to the rinsing units 226 may be disposed in plural numbers upstream from the drier 228 being single. Furthermore, the first dust removing device 212 may be single upstream from devices from the cleaning rollers 220 to the driers 228 in plural numbers. Alternatively, the first dust removing device 212 and the cleaning roller 220 may be single upstream from the rinsing units 226 and the driers 228 in plural numbers. Additionally, the first dust removing device 212, the cleaning roller 220 and the rinsing unit 226 may be single upstream from the two or more driers 228. Any modification may be used.

In the above embodiment, the cleaning liquid 232 in the cleaning liquid bath 230 is cleaned and supplied to the rinsing unit 226 in circulation. Alternatively, an additional liquid bath may be disposed for supplying cleaning liquid to the rinsing unit 226 in a separate manner from the cleaning liquid bath 230.

Figure 15D:
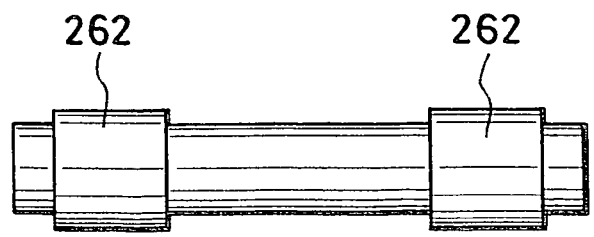
FIG. 15D is a plan illustrating a pair of edge rollers in combination.

In FIG. 15D, an alternative roller is depicted to be used instead of the hovering rollers 216A-216C. The roller includes a shaft portion and a pair of edge rollers 262 for supporting edge portions of the resin film 210. Also, a combined structure including the hovering rollers 216A-216C and the edge rollers 262 may be used.

Although a diameter of the edge rollers 262 may be great for the purpose of preventing flexure or looseness, the diameter is determined 3-30 cm, preferably 5-15 cm in view of a space to be used and its suitable weight. Portions of the edge rollers 262 may be formed with a shaft portion as originally one piece, or else may be previously separate rings and secured to a shaft fixedly. The sizes of the edge rollers 262 and the shaft are so determined that the resin film 210 will not contact the shaft when loosened, and that no wrinkles will occur in the resin film 210 being fed. A difference between diameters of the edge rollers 262 and the shaft is 0.4-20 mm, and preferably 1-5 mm. An area of contact of the edge rollers 262 to the resin film 210 should preferably be small in view of reducing repeated deposition of dust or foreign matter to the resin film 210. A width of a zone for contact of the edge rollers 262 to the resin film 210 on each of the lateral sides is 1 mm or more, preferably 5 mm or more in consideration of preventing disengagement of the resin film 210 from the edge rollers 262 even when the resin film 210 travels in a zigzag shifted manner.

EXAMPLES

Comparative Example 6

Prior Art

Figure 16:
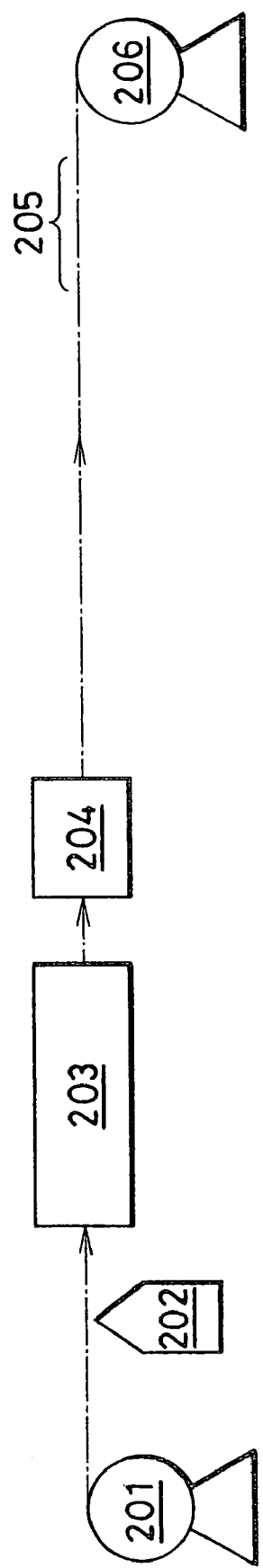
FIG. 16 is a block diagram illustrating an overall arrangement of a sheet producing system having the dust removing apparatus.

In FIG. 16, a web supply device 201 supplied polyethylene terephthalate film at a speed of 50 m/min. The film was 100 μm thick and 100 cm wide. A coater head 202 coated the film with coating solution including particles of latex of which average diameters were 3 μm and 10 μm. A drier zone 203 evaporated the coating solution to obtain film in which an amount of deposited foreign matter was controlled. Composition of the coating solution including the latex was as follows:

| | |
|---|---|
| 3 μm latex stock solution | 0.1 ml |
| 10 μm latex stock solution | 3.0 ml |
| Methanol | 46.9 ml |
| Pure water | 50.0 ml |

The latex stock solution includes monodisperse polystyrene latex at 1 wt. %. The resin film 210 was coated with the solution at 25 ml/m². A surface of the resin film 210 was dried, and then checked visually through a microscope. It was observed that latex particles of 3 μm and 10 μm were regularly deposited on the surface at a density of approximately 1,000 particles per 1 m².

Then a dust removing zone 205 of a wet type in FIG. 16 received the resin film 210 being fed, and removed dust from the same. The dust removing zone 205 had a fountain coater disclosed in JP-B 5-050419 (corresponding to JP-A 62-060749), which coated the resin film 210 with methanol at 20 ml/m². Immediately after this, a rotating wire bar was pressed against the resin film 210 for removing dust. The wire bar was 100 cm long in the width direction of the resin film 210, and 1 cm across. Sections before and after the dust removing zone 205 are separate in application of tension to the resin film 210. The tension was 118 N/m per unit width (12 kgf/m per unit width).

After this, traveling of the resin film 210 was stopped. The resin film 210 was dried, and wound by a winder 206. In the zone 205 disposed upstream from the winder 206, a sample piece being 1 meter long was taken from the resin film 210 for evaluation of the dust removal. The sample piece was observed through a microscope set at a power of 100 times, to count the remainder of the latex particles. In case of existence of scratches in the surface of the resin film 210, damaged grades of the resin film 210 were recorded. Those grades were as follows.

| Scratches (/m) | Grade |
|---|---|
| 0 | None |
| 1-10 | Locally Existing |
| 10-100 | Numerous |

Sampling of a piece was effected for two times, one time after treatment of 50 meters in a continuous manner, and the second time after treatment of 3,000 meters in a continuous manner. Reliability related to lapse of time was checked.

In Comparative Example 6, a wire bar was contacted with the resin film 210 and caused to rotate at 50 r.p.m. in reverse to the traveling. In FIG. 17A, results of this are illustrated. The number of latex particles decreased. In spite of the initially existing 100 particles per 1 meter, the particles of 3 μm became approximately ⅕ as numerous as before. The particles of 10 μm became approximately 1/10 as numerous as before. The number of particles of dust or foreign matter became increased upon treatment of 3,000 meters in comparison with treatment of 500 meters. Many visible scratches occurred in the surface of the resin film 210.

Comparative Example 7

Prior Art

The resin film 210 was subjected to the dust removal of the wet type by using latex particles in the same manner as Comparative Example 6 except for a roller in a dust removing zone 204 of a wet type. See FIG. 16. The cleaning roller, in a manner similar to the cleaning roller 220 in FIG. 15A, included an aluminum roller body and a rubber roll disposed thereabout. The roller body was 110 cm long and 20 cm across. The rubber roll was formed from Viton rubber and was 1 cm thick. Guide rollers were adjusted to set the angle of lap of the cleaning roller at 50 degrees to the resin film 210. A lower portion of the cleaning roller is dipped in methanol or cleaning liquid at a depth of 10 cm. The cleaning roller was rotated at 50 r.p.m. in reverse to the traveling direction. The methanol was circulated and filtrated, treated by the pressure feed pump 236 and the ultrasonic vibrator 240, and sent to the rinsing unit 226.

The rinsing unit 226 had a clearance which was 100 cm long as viewed in the film width direction of the resin film 210, and 1 mm wide as viewed in the traveling direction, and supplied the cleaning liquid 232 at a flow speed of 30 liters per minute. The filtration equipment 238 included Astro Pore Filter (trade name) manufactured by Fuji Photo Film, Co., Ltd. The filter had a nominal size of the minute openings of 0.2 μm.

Two ultrasonic vibrators 240 manufactured by Japan Alex Corporation were used, arranged crosswise to the traveling direction of the resin film 210, and caused to emit ultrasonic waves to the whole range of the cleaning rubber roller. Each of the ultrasonic vibrators 240 was 50 cm long and 30 cm across, and emitted the ultrasonic waves of 100 kHz at the power of 1,000 W.

Results of experiments of Comparative Example 7 are shown in FIG. 17A. In comparison with Comparative Example 6 according to the prior art, the number of remaining particles is smaller. There is a smaller increase in the particles after the treatment of 3,000 meters. In conclusion, those were obtained by effects of the cleaning roller and application of ultrasonic waves for cleaning. A surface of the rubber roll of Viton was visually observed after the treatment of 3,000 meters. No deposition of particles was discovered.

Comparative Example 8

Prior Art

The resin film 210 was subjected to the dust removal of the wet type by using the cleaning roller 220 in the same manner as Comparative Example 7, but except for the dust removing zone 205 of a wet type in FIG. 16 which was provided with the first dust removing device 212, the drier 228 and the edge rollers 262 of a non-contact type. For the first dust removing device 212 and the drier 228, see FIG. 15A.

Each of the first dust removing device 212 and the drier 228 was provided with a New Ultra Cleaner (trade name) type UVU-W manufactured by Shinko Co., Ltd. In the cleaner, a distance to the resin film 210 was 3 mm. A flow speed for blow of air was 15 m³/min. A pressure for blow of air was 20 kPa. A flow speed for exhaust of air was 20 m³/min. A pressure for exhaust of air was 5 kPa. In the edge rollers 262, the shaft portion was 10 cm across. The periphery of the edge rollers 262 had a diameter of 10.4 cm. A range of contact of the edge rollers 262 with the resin film 210 was 1 cm. Note that the resin film 210 was 100 cm wide.

Results of the experiments are shown in FIG. 17B at Comparative Examples 8a and 8b. Comparative Example 8a is the same as Comparative Example 7 except for that the dry type of dust removal is added to a step before the wet type of dust removal. As a result, the number of remaining foreign particles decreased even after treatment of 50 meters. The structure combined with the dry type of dust removal was found effective. Comparative Example 8b is the same as Comparative Example 8a except for the addition of the drier 228 after the wet type of dust removal, and the edge rollers 262 of a non-contact type in relation to the surface after the dust removal. The numbers of the remaining particles were decreased considerably. No increase occurred in the number of particles of dust even after treatment of 3,000 meters. However, it was found that there was a smaller effect to removal of 3 μm particles than to that of 10 μm.

Sample 5

The resin film 210, according to the invention, was subjected to the dust removal of the wet type in the same manner as Comparative Example 8, but except for the dust removing zone 205 of a wet type in FIG. 16 which is provided with the cleaning roller 220 depicted in FIG. 15A.

The cleaning roller 220 included the aluminum roller body and the resilient roll 218 disposed thereabout. The roller body was 110 cm long and 20 cm across. The resilient roll 218 was formed from Viton rubber, was 0.2 cm thick and 100.2 cm long. The resilient roll 218 was fitted about the roller body in a symmetrical manner. The cleaning roller 220 was positioned so that the resin film 210 passes a position exactly at the top of the periphery of the cleaning roller 220.

Results of the experiments are shown in FIG. 17B at Samples 5a and 5b. Sample 5a is the same as Comparative Example 8b except for that the pinch roller 224 applies pressure of 9.8 N/m per unit width (1 kgf/m per unit width). As a result, the number of remaining foreign particles decreased. The structure combined with the pinch roller 224 was found effective. Sample 5b was the same as Sample 5a except for that the pinch roller 224 applied pressure of 19.6 N/m per unit width (2 kgf/m per unit width). The numbers of the particles of 3 μm and 10 μm were decreased to approximately zero (0). No increase occurred in the number of particles of dust or foreign matter even after treatment of 3,000 meters. In conclusion, dust was reliably removed from the resin film 210 according to the dust removal of the invention.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A thermal treating method for a dried coating layer, the coating layer formed by coating traveling web with coating liquid, comprising:

blowing said dried coating layer with hot air through an air blow opening; and sucking said hot air from said dried coating layer in a position upstream or downstream from said air blow opening according to a traveling direction of said web such that, while said hot air flows on said dried coating layer in the traveling director of said web, a flow speed of said hot air remaining equal to or lower than 1 m/sec with reference to a web width direction;

wherein said flow speed of said hot air in said web width direction is less than the flow speed of said hot air in said traveling direction of said web;

wherein said thermal treating is used in a process of forming a liquid crystal layer in a production of an optical compensatory sheet, and said coating contains a liquid crystalline compound.

2. The thermal treating method as defined in claim 1, wherein a temperature of said hot air is in the range of 70° C. to 300° C.

3. The thermal treating method as defined in claim 1, further comprising adjusting a moisture component included in said hot air.

* * * * *